United States Patent
Brilliant

(10) Patent No.: US 12,215,672 B2
(45) Date of Patent: Feb. 4, 2025

(54) LARGE INDUCTORS FOR LIGHTNING PROTECTION OF POWER SYSTEMS

(71) Applicant: VESTAS WIND SYSTEMS A/S, Aarhus N (DK)

(72) Inventor: Nathan A. Brilliant, Arvada, CO (US)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 509 days.

(21) Appl. No.: 17/623,123

(22) PCT Filed: Jun. 24, 2020

(86) PCT No.: PCT/DK2020/050186
§ 371 (c)(1),
(2) Date: Dec. 27, 2021

(87) PCT Pub. No.: WO2020/259777
PCT Pub. Date: Dec. 30, 2020

(65) Prior Publication Data
US 2022/0228571 A1    Jul. 21, 2022

Related U.S. Application Data

(60) Provisional application No. 62/866,682, filed on Jun. 26, 2019.

(30) Foreign Application Priority Data

Aug. 2, 2019   (DK) .......................... PA 2019 70490

(51) Int. Cl.
F03D 80/30    (2016.01)
F03D 1/06     (2006.01)
H02G 13/00    (2006.01)

(52) U.S. Cl.
CPC ........... *F03D 80/30* (2016.05); *F03D 1/0675* (2013.01); *H02G 13/80* (2013.01)

(58) Field of Classification Search
CPC ...... F03D 1/0675; F03D 80/30; F03D 80/301; F03D 80/40; F03D 80/401; F03D 80/402; F03D 80/403; H02G 13/80
See application file for complete search history.

(56) References Cited

U.S. PATENT DOCUMENTS

| 8,449,259  | B1  | 5/2013 | Kaser |
| 10,927,821 | B2* | 2/2021 | Badger .................... H05B 3/34 |

(Continued)

FOREIGN PATENT DOCUMENTS

| CN | 103527421 A | 1/2014  |
| CN | 105209753 A | 12/2015 |

(Continued)

OTHER PUBLICATIONS

PCT, Notification of Transmittal of The International Search Report and The Written Opinion of The International Searching Authority, or The Declaration for Application PCT/DK2020/050186 dated Sep. 22, 2020.

(Continued)

*Primary Examiner* — Sang K Kim
(74) *Attorney, Agent, or Firm* — Patterson + Sheridan, LLP

(57) ABSTRACT

Embodiments herein describe a discharge filter, located in a root of a wind turbine blade, which includes one or more cables wound into large scale inductors using an internal or external surface of the root as a mandrel. These cables provide power inputs to an electrical panel for one or more a powered systems that are located in a body of the wind turbine blade. The electrical panel is connected to a lightning protection system that selectively provides a path to ground, (Continued)

and the inductors form a high-impedance barrier that shunts power away from the cables and onto the lightning protection system in the event of a lightning strike or other electrical discharge traveling from the powered systems to the electrical panel.

20 Claims, 25 Drawing Sheets

(56) References Cited

U.S. PATENT DOCUMENTS

| | | | |
|---|---|---|---|
| 11,852,122 B2 * | 12/2023 | Bertolotti | F03D 1/0675 |
| 11,898,542 B2 * | 2/2024 | Roed | F03D 80/40 |
| 2012/0287549 A1 | 11/2012 | Tanaka et al. | |
| 2013/0100570 A1 | 4/2013 | Lyngby et al. | |
| 2018/0274521 A1 | 9/2018 | Akhtar et al. | |

FOREIGN PATENT DOCUMENTS

| | | |
|---|---|---|
| DE | 102011051789 B3 | 1/2013 |
| DK | 178375 B1 | 1/2016 |
| EP | 2088313 A2 | 8/2009 |
| EP | 2857678 A1 | 4/2015 |
| EP | 2889477 A1 | 7/2015 |
| WO | 2020259777 A1 | 12/2020 |

OTHER PUBLICATIONS

Danish Patent and Trademark Office, 1st Technical Examination including The Search Report for Application PA 2019 70490 dated Jan. 31, 2020.

China National Intellectual Property Administration, First Notification of Office Action for Application 202080058235.X dated Apr. 24, 2023.

* cited by examiner

LARGE INDUCTORS FOR LIGHTNING PROTECTION OF POWER SYSTEMS

BACKGROUND

Field

Embodiments presented in this disclosure generally relate to protective systems for wind turbines. More particularly, the present disclosure relates to a lightning discharge filter system with improved operational and manufacturing characteristics.

Description of the Related Art

Wind turbine generators are an increasing popular source for generating electricity and may be deployed singly or in groups of several wind turbines, often referred to as a wind farm. To increase the efficiency, safety, and durability of wind turbines and wind farms, designers may incorporate various powered systems into the blades of the wind turbines, such as, for example, lights, de-icing systems, sensors, etc. These powered systems may receive operational power delivered via one or more electrical leads running along the length of the blade. These electrical leads carry power to the powered systems during normal operations, but also present a conductive path that lightning or other electrical discharges may take. Lightning strikes are a concern for wind turbine operators, as wind turbines are often the tallest objects in the vicinity and one or more of the electrical leads incorporated in the blades can offer a path of least impedance that passes through sensitive components.

SUMMARY

In one embodiment, a wind turbine blade is provided, which includes: a discharge filter, located in a root of the wind turbine blade, including a first cable wound into a first inductor using the root as a mandrel; a powered system, located in a body of the wind turbine blade; an electrical panel, located between the discharge filter and the powered system in the body of the wind turbine blade, wherein the first cable is configured to provide power to the powered system through the electrical panel.

In the present disclosure the expression "using the root as a mandrel" means that the cable is wound about the root of the wind turbine blade. The expression does not mean that the cable can only be wound onto the outside of the root. The cable can also be wound on the inside of the root. In other words, the inductor is supported by a diameter of the root.

In some embodiments, in combination with any wind turbine blade described above or below, wherein the mandrel is an exterior surface of the root or an interior surface of the root.

In some embodiments, in combination with any wind turbine blade described above or below, the first inductor is at least partially embedded in a material comprising the root.

In some embodiments, in combination with any wind turbine blade described above or below, the first cable is a bundled cable including a live line, a neutral line, and a protective earth line.

In some embodiments, in combination with any wind turbine blade described above or below, the discharge filter further includes: a second cable wound into a second inductor using the root as a mandrel and is intertwined with the first inductor; and a third cable wound into a third inductor using the root as a mandrel.

In some embodiments, in combination with any wind turbine blade described above or below, a pathway between the first cable and the powered system is linked via a surge protection device to a lightning protection system offering a lower impedance path to ground than the first cable.

In one embodiment, a wind turbine blade is provided, which includes: an electrical panel, receiving at an input: a first cable; a second cable; and a third cable; and a discharge filter located between a power source and the electrical panel in a root of the blade, the discharge filter comprising: a first inductor, comprising a portion of the first cable wound around the root as a mandrel; a second inductor, comprising a portion of the second cable wound around the root as a mandrel; and a third inductor, comprising a portion of the third cable wound around the root as a mandrel.

In some embodiments, in combination with any wind turbine blade described above or below, the root is a hollow cylinder and the mandrel is an interior surface of the root.

In some embodiments, in combination with any wind turbine blade described above or below, wherein the electrical panel further receives a fourth cable at the input, and the discharge filter further comprises: a fourth inductor, comprising a portion of the fourth cable wound around the root as a mandrel. In further embodiments, wherein the electrical panel further receives a fifth cable at the input, and the discharge filter further comprises: a fifth inductor, comprising a portion of the fifth cable wound around the root as a mandrel.

In some embodiments, in combination with any wind turbine blade described above or below, the first cable, the second cable, and the third cable are included in a single bundled cable wound into a bundled inductor.

In some embodiments, in combination with any wind turbine blade described above or below, the first inductor is intertwined with the second inductor.

In some embodiments, in combination with any wind turbine blade described above or below, the first inductor, the second inductor, and the third inductor are wound sequentially about the root.

In one embodiment a wind turbine is provided which comprises a plurality of blades, wherein each blade of the plurality of blades is electrically connected to a power source via rotatable contacts in a nacelle from which a root of the blade extends towards a tip of the blade, each blade comprising: a first cable, electrically connected to the power source via the nacelle, and wound into a first inductor supported by a diameter of the root and connected to an input of an electrical panel, and a powered system, connected to an output of the electrical panel via an electrical lead and located tipward of the electrical panel;

In one embodiment, a wind turbine is provided, which includes: a plurality of blades, wherein each blade of the plurality of blades is electrically connected to a power source via rotatable contacts in a nacelle from which a root of the blade extends towards a tip of the blade, each blade comprising: a first cable, electrically connected to the power source via the nacelle, and wound into a first inductor supported by a diameter of the root and connected to an input of an electrical panel; a second cable, electrically connected to the power source via the nacelle, and wound into a second inductor supported by the diameter of the root and connected to the input of the electrical panel; a third cable, electrically connected to protective earth via the nacelle, and wound into a third inductor supported by the diameter of the root and connected to the input of the electrical panel; a powered system, connected to an output of the electrical panel via an electrical lead and located tipward of the electrical panel; and a lighting protection system, that is electrically isolated from the first cable, the second cable, and the third cable in the blade, that is connected to ground via the nacelle, and that is selectively connected to the electrical panel, wherein when connected to the electrical panel, the lightning protection system provides a lower impedance path to ground than the first cable, the second cable, and the third cable.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

To protect a wind turbine that uses blades containing powered systems from lightning strikes or other electrical discharges, an operator may physically disconnect the electrical lead from the turbine when at risk of lightning (thus de-powering the powered systems) or may include a Lightning Discharge Filter System (LDFS) and surge protection devices on the cabling that supplies power to the powered systems in the blades to shunt the lightning current away from sensitive systems and to ground. An LDFS includes one or more inductors at the power input to the blade, which may include inductors on the live (single or multi-phase), neutral, and protective earth lines. Because the majority of the damage to wind turbine components associated with lightning strikes has been observed to be due to the higher frequency components of the lightning compared to the power supplied from the turbine to the blades, the inductors of the LDFS provide a low-pass filter that blocks the current from lightning strikes, but allows power of 50 Hz (Hertz) or 60 Hz to continue to flow to the powered systems.

Due to the mass of the inductors included in the LDFS, the inductors are preferably included in the base or root of each blade to reduce rotational stresses on the wind turbine. Although an LDFS may use off-the-shelf discrete inductors to provide low-pass filters to block lightning and permit power flow, such inductors are bulky, difficult to mount within a blade assembly intended to rotate, and have relatively poor heat transfer properties, and thus suffer from thermal issues when conducting continuous power. The present disclosure therefore provides LDFSs using large-scale fabricated inductors that are adapted to the dimensions of the root of the blade in which the LDFS is deployed. Each large-scale inductor forms a low-pass filter, and uses the physical structure of the blade for support, thus improving the ease and security of mounting and reducing the mass of the blade (and the associated rotational stresses). Additionally, as the structure of a blade root can be in excess of 1 m (meter) in diameter, the large-scale inductors exhibit a surface area to volume ratio greater than prior LDFS inductors, and thus exhibit superior heat transfer properties.

Example Embodiments

Figure 1:
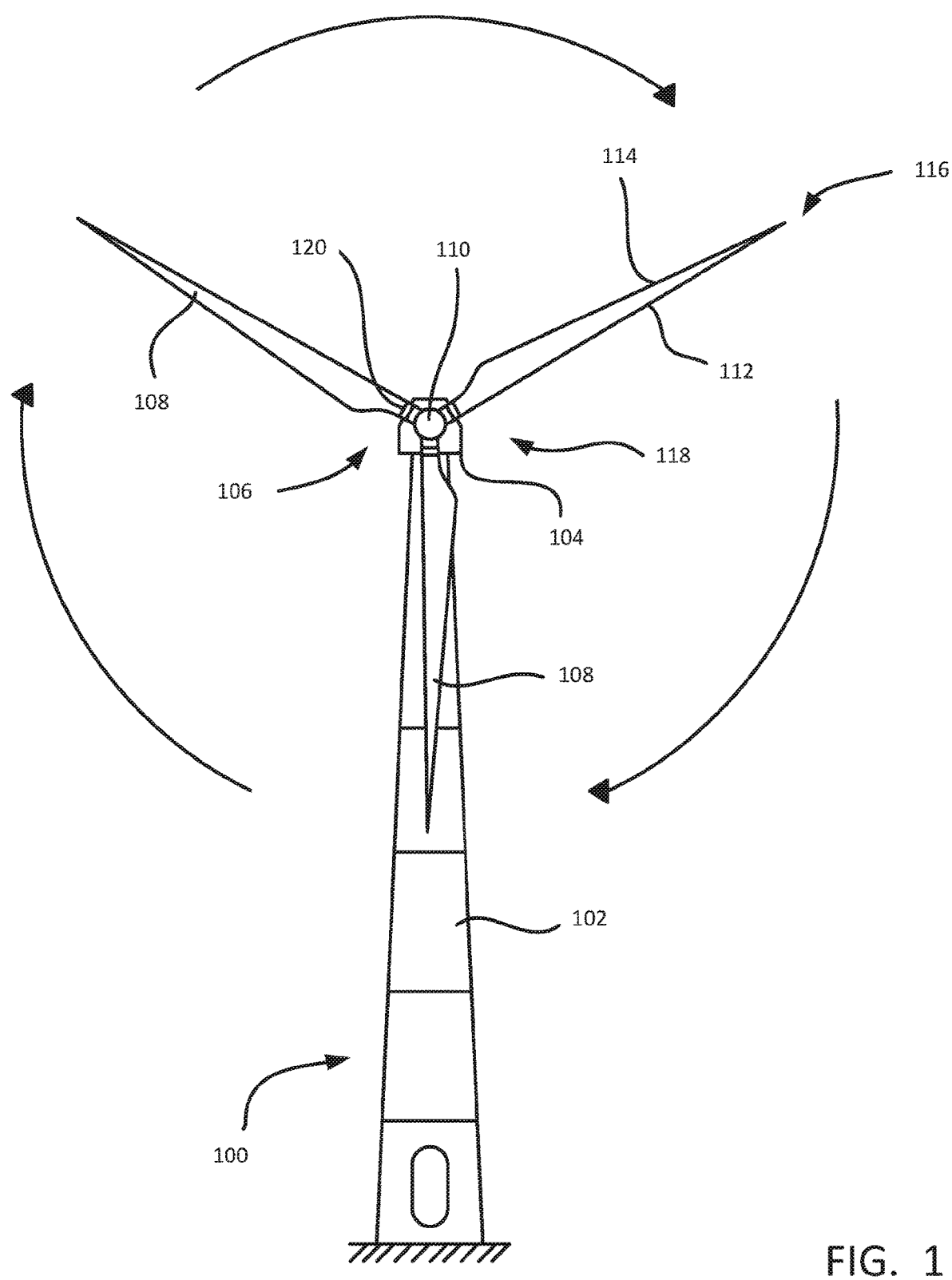
FIG. 1 illustrates a diagrammatic view of an exemplary wind turbine generator, according to embodiments of the present disclosure.

FIG. 1 illustrates a diagrammatic view of an exemplary Wind Turbine Generator (WTG) 100. Although the WTG 100 is illustrated as a horizontal-axis wind turbine, the principles and techniques described herein may be applied to other wind turbine implementations, such as vertical-axis wind turbines. The WTG 100 typically comprises a tower 102 and a nacelle 104 located at the top of the tower 102. A rotor 106 may be connected with the nacelle 104 through a low-speed shaft extending out of the nacelle 104. As shown, the rotor 106 comprises three rotor blades 108 mounted on a common hub 110, which rotate in a rotor plane, but the rotor 106 may comprise any suitable number of blades 108, such as one, two, four, five, or more blades 108. The blades 108 (or airfoil(s)) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120, such that each blade 108 may be rotated around a respective longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
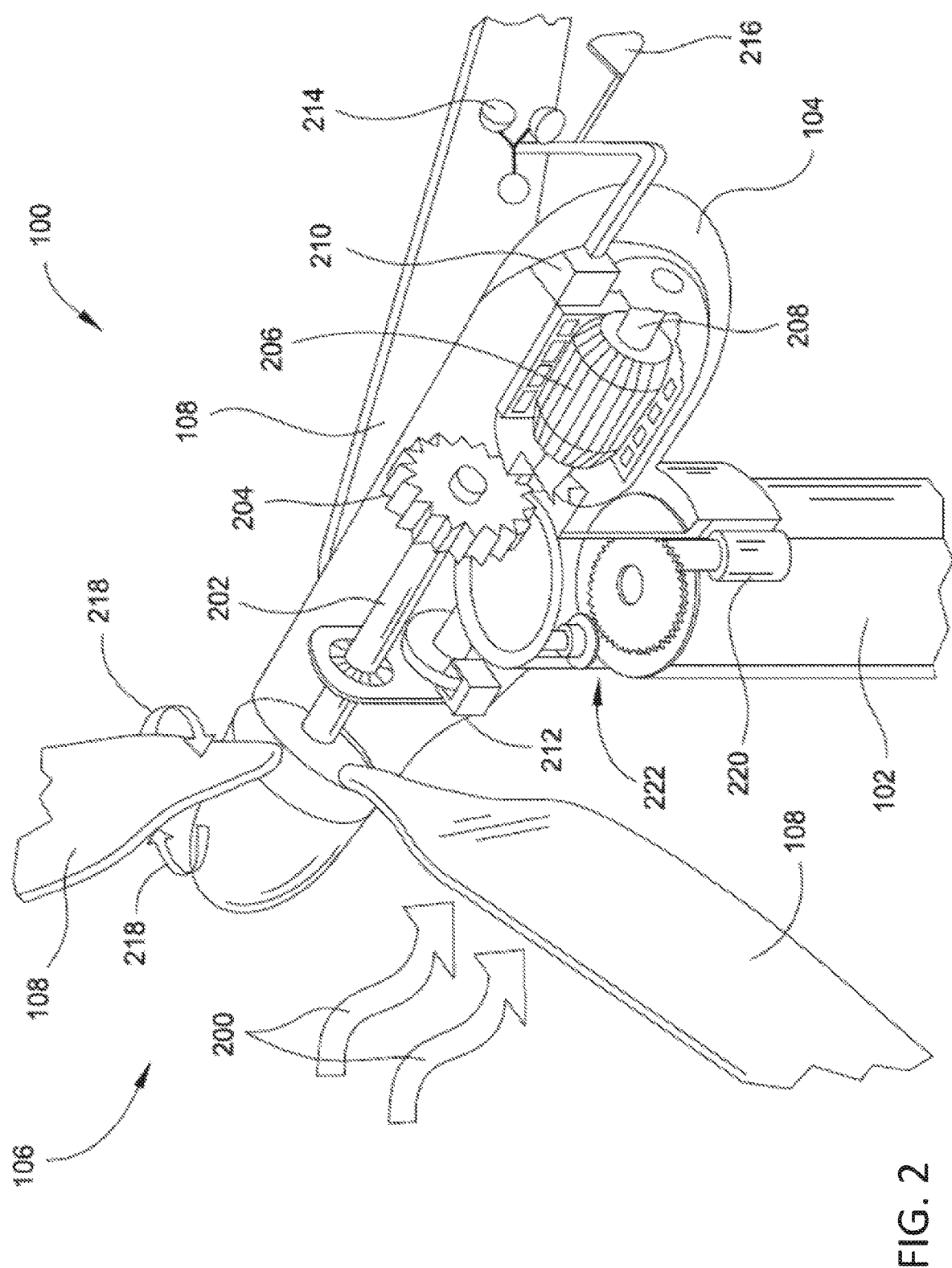
FIG. 2 illustrates a diagrammatic view of typical components internal to a wind turbine generator, according to embodiments of the present disclosure.

FIG. 2 illustrates a diagrammatic view of typical components internal to the nacelle 104 and tower 102 of the WTG 100. When the wind 200 is incident on the blades 108, the rotor 106 rotates and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the low-speed shaft 202 and the high-speed shaft 208. If the controller 210 determines that the shaft(s) are rotating too fast, the controller 210 may pitch the blades 108 out of the wind 200 or by increasing the torque from the generator 206 which slows the rotation of the rotor 106—i.e., reduces the revolutions per minute (RPM). A braking system 212 may prevent damage to the components of the WTG 100 by keeping the hub 110 from rotating when the hub 110 is already at, or very close, to standstill. The controller 210 may also receive inputs from an anemometer 214 (providing wind speed) and/or a wind vane 216 (providing wind direction). Based on information received, the controller 210 may send a control signal to one or more of the blades 108 to adjust the pitch 218 of the blades 108. By adjusting the pitch 218 of the blades 108, the rotational speed of the rotor 106 (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
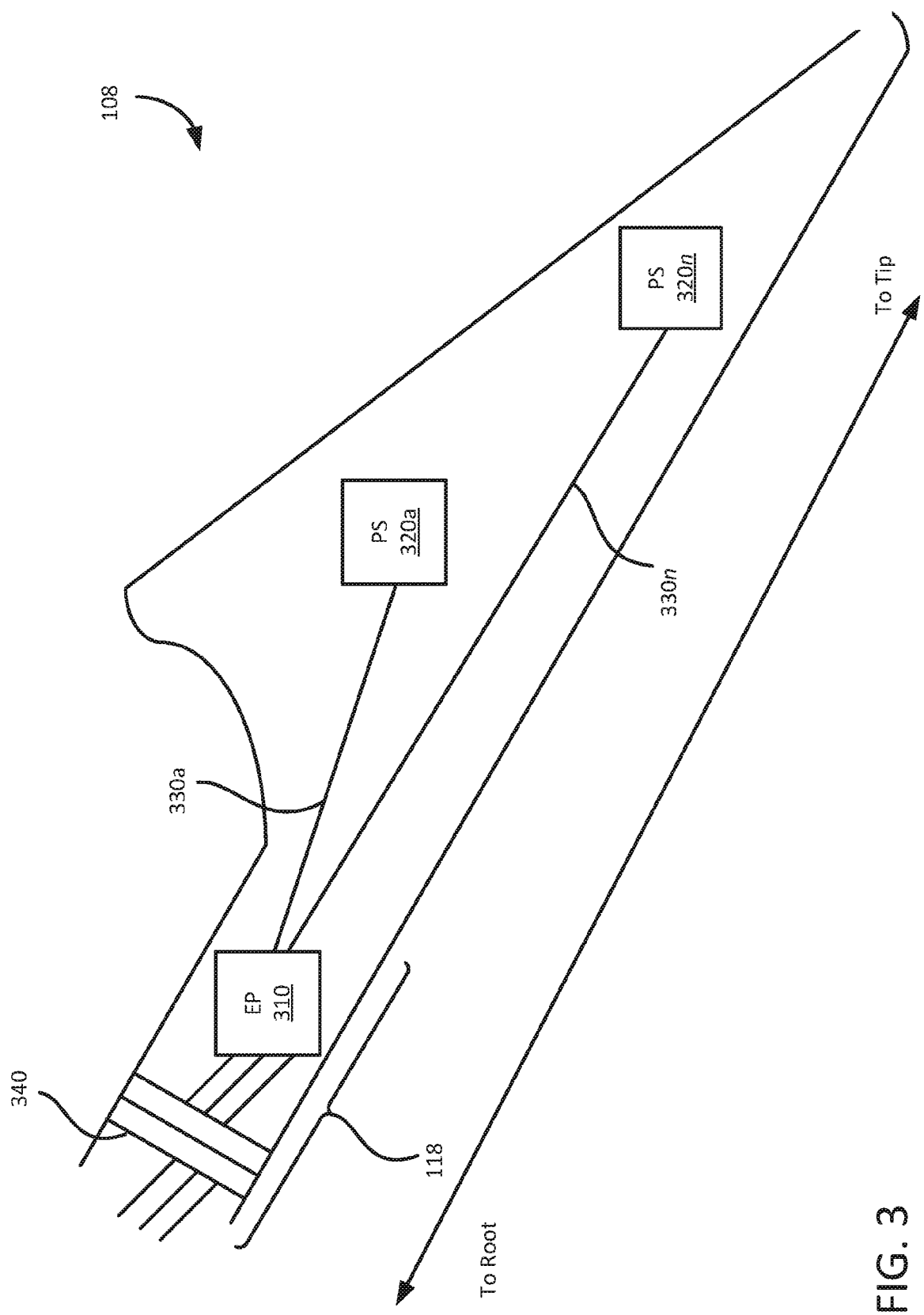
FIG. 3 illustrates the relative placement of several electrical components of a wind turbine blade, according to embodiments of the present disclosure.

FIG. 3 illustrates the relative placement of several electrical components of a wind turbine blade 108, according to embodiments of the present disclosure. The body of a wind turbine blade 108 is generally hollow, which reduces the weight of the blade 108 and allows for various components to be fully or partially included inside of the blade 108. For example, a sensor may be mounted to an exterior surface of the blade 108 and include wires running on an interior surface of the blade or in the material of the blade 108.

The blade 108 includes an electrical panel 310, which selectively provides power to one or more powered systems 320a-n (generally, powered system 320) via associated electrical leads 330a-n (generally, electrical lead 330). The electrical panel 310 is mounted internally to the blade 108, near or in the root 118. The powered systems 320 are located at various positions in the blade 108 tipward from the electrical panel 310, and may include de-icing systems, wind sensors, rotational sensors, flexion sensors, lights, etc., that may be mounted externally, internally, embedded in the material, and through the surface of the blade 108. The electrical leads 330 may include live and neutral lines for carrying power to/from associated powered systems 320, and may include optical communications channels or electrical communications channels for carrying data from or command signals to the various powered systems. Each of the powered systems 320 may be connected in parallel to the electrical panel 310 via an associated electrical lead 330, or several powered systems 320 may be connected in series with one another via a shared electrical lead 330.

To protect the WTG that supplies power for the various powered systems 320 from lightning and other electrical discharges carried rootward along the electrical leads 330, the root 118 includes an LDFS located rootward of the electrical panel 310 and one or more surge protection devices 470 to shunt the lightning current away to ground. For example, in a system supplying 1-phase power to the blade 108, the LDFS includes inductors 340 formed from the cables supplying, respectively, a live line (e.g., a powered path or "hot" wire), a neutral line (e.g., a return path), and a protective earth line (e.g., a grounding path). In other embodiments, more or fewer cables and associated inductors 340 carrying different power options are provided to the blade 108, such as, for example: two-phases and ground, two-phases, neutral, and ground; three phases and ground; three phases, neutral, and ground; etc. In some aspects, several examples for how the individual inductors 340 for each cable in a three-cable system are formed and placed relative to one another are discussed in greater detail in regard to FIGS. 5A-6F. Several examples for how the individual cables for four-cable systems and five-cable systems are formed and placed relative to one another are discussed in greater detail in regard to FIGS. 7A-7D and FIGS. 8A-8E, respectively.

Generally, the inductors 340 use the physical structure of the root 118 as a mandrel and as physical support. The inductors can be located on the exterior or the interior of the root, or embedded within the material of the root. The cables are wound into a desired number of coils about the root 118 to provide an inductance value capable of providing a low-pass filter between the electrical panel 310 and a power source connected via the cables through the nacelle 104. The cables may be connected to the power source via various rotatable contacts in the nacelle 104.

The inductance of a coil inductor, such as the inductors 340 described herein that are formed from the cabling to the electrical panel 310, may be determined according to Formula 1, where L is the inductance, µ is the permeability of the core material(s), N is the number of turns, r is the radius of the core, and ℓ is the length of the inductor.

$$L = \mu * N^2(\pi r^2)/\ell \qquad (1)$$

Accordingly, using the structure of the root 118, which may be greater than 1 m in diameter, as a mandrel about which the cables are wound provides a similarly large value for r. By using a larger radius, the inductors 340 may be wound fewer times and thus extend for a shorter distance compared to a discrete inductor of a similar inductance but smaller radius, allowing a fabricator to place the mass of the inductor closer to the mounting point of the blade 108 and the hub 110, thus reducing the moment of the blade 108. The large radius of the inductors 340 wound about the root 118 also provides the inductors 340 with a greater ratio of surface area to volume compared to a discrete inductor of a smaller radius but equivalent inductance. The greater surface area to volume ratio provides the inductors 340 with superior heat dissipation characteristics compared to discrete inductors with a smaller radius.

In various embodiments, the value for µ is the value of free space permeability (e.g., when using an air core of the hollow space of the interior of root 118), but may also include the permeability effects of the material of the root 118 (e.g., when the inductors 340 are wound around the exterior or embedded in the material of the root 118) or the permeability effects of any other devices or cabling co-located in the root 118. The coils may be arranged so that they form a common mode choke that presents a low impedance for the power from the hub 110 to the powered systems 320, but a high impedance for the lightning transients from the blade 108 towards the hub 110.

Depending on the radius of the root 118, permeability of the core, and desired cutoff frequency for the low-pass filter, the fabricator can determine the associated length and number of coils to employ when designing and manufacturing the inductors 340 for the desired inductance. Additionally, depending on the placement of the individual inductors 340 relative to one another, the inductors 340 may exhibit mutual inductance, which the fabricator also accounts for when designing and manufacturing the inductors 340 for the desired cutoff frequency.

Figure 4:
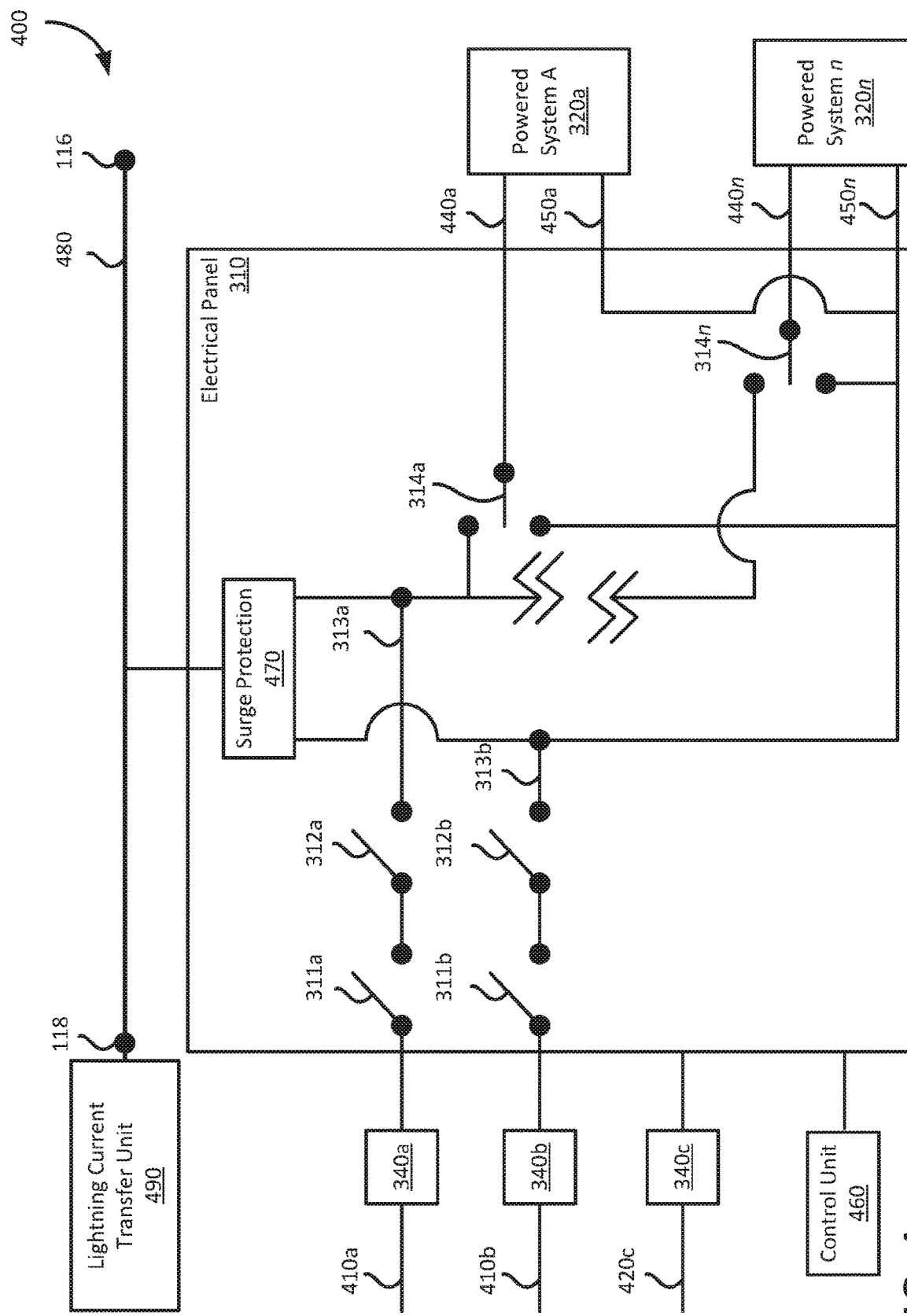
FIG. 4 is a block diagram of the circuity for supplying power to the powered systems via an electrical panel fed by a Lightning Discharge Filter System according to embodiments of the present disclosure.

FIG. 4 is a block diagram of the circuitry 400 for supplying power to the powered systems 320 via an electrical panel 310 fed by an LDFS according to embodiments of the present disclosure. In the illustrated electrical panel 310, the circuitry is configured for operation with three cables 410a-c (generally, cable 410) supplying power and reference values, although in other examples, the electrical panel 310 may receive more cables that carry additional phases of power or reference values.

In one embodiment, the electrical panel 310 receives, at an input side, a live line via a first cable 410a wound into the first inductor 340a, a neutral line via a second cable 410b wound into the second inductor 340b, and a protective earth line via a third cable 410c wound into the third inductor 340c. The protective earth line supplies a ground reference to the electrical panel, while the live line and neutral line provide power and a return path to selectively activate one or more powered systems 320. In other three-cable configurations, the electrical panel 310 and associated circuitry 400 receive a first phase of power via the first cable 410a, a second (different) phase of power via the second cable 410b, and protective earth via the third cable 410c. In a further embodiment, the electrical panel 310 and associated circuitry 400 receive four cables 410 wound into associated inductors 340 that provide two different phases of power, neutral, and ground references or three different phases of power and a ground reference. In another embodiment, the electrical panel 310 and associated circuitry 400 receive five cables 410 wound into associated inductors 340 that provide three different phases of power, neutral, and ground references. Although FIG. 4 is primarily discussed in relation to a live/neutral/ground configuration of a three-cable embodiment, the present disclosure envisions the deployment of large-scale inductors 340 formed from the cables 410 supplied to an electrical panel 310 in a blade 108 of a WTG 100 using various configurations of various numbers of cables.

The electrical panel 310 selectively provides, on an output side, an associated live line and neutral line for each powered system 320 as a respective primary lead 440 and secondary lead 450 of the electrical leads 330 that provide live/neutral electrical inputs or different phases of power as electrical inputs. For example, a first powered system 320a includes a first primary lead 440a and a first secondary lead 450a connecting the first powered system 320a to the electrical panel 310, which selectively provides power to the first powered system 320a. Similarly, an nth powered system 320n includes an nth primary lead 440n and an nth secondary lead 450n connecting the nth powered system 320n to the electrical panel 310, which selectively provides power to the nth powered system 320n.

Additionally, the electrical panel 310 may receive control signals or output status signals to a control unit 460, either located internally to the electrical panel 310 or as a separate device. The control unit 460 can relay data to the powered systems 320, receive data from the powered systems 320, and monitor and control various components of the electrical panel 310. In various embodiments, the control unit 460 is a computing device including a processor, a memory storage device (e.g., a hard drive) that is included in each blade 108 for controlling systems thereof, that is included in the WTG 100 for controlling the systems thereof and in several blades 108, or that is included in a wind farm for controlling the systems thereof and in several WTGs 100.

Internally, the electrical panel 310 includes a primary path 313a connecting the first cable 410a to the primary leads 440a-n of the powered systems 320a-n and a secondary path 313b connecting the second cable 410b to the secondary leads 450a-n of the powered systems 320a-n. Generally, the primary path 313a and the secondary path 313b may be referred to as internal paths 313 (along with a tertiary path, quaternary path, etc., connected to the third, fourth, etc., cables respectively (not illustrated)). The primary path 313a includes a first selective switch 311a (generally, selective switch 311) and a first circuit breaker 312a (generally, circuit breaker 312). Similarly, the secondary path 313b includes a second selective switch 311b and a second circuit breaker 312b. The selective switches 311 are selectively controlled (e.g., via signals from the control unit 460) to open or close to establish or disconnect an associated internal path to the powered systems 320a-n. The circuit breakers 312 are controlled by the thermal and/or electrical properties experienced on the internal paths to automatically open and disconnect an associated internal path 313 to the powered systems 320a-n. In various embodiments, the relative positions of the selective switches 311 and the circuit breakers 312 may be swapped from the order illustrated in FIG. 4 or the selective switches 311 and circuit breakers 312 on a given internal path 313 may be combined into one component (e.g., a selectively switched circuit breaker).

Each powered system 320a-n is connected to two or more internal paths 313 by respective system switches 314a-n that may be controlled to selectively provide power to individual powered systems 320a-n.

Each internal path 313 is connected by one or more surge protection devices 470 to a lightning protection system 480 for the blade 108. A lightning protection system 480 provides an alternative, lower-impedance, path for lightning striking the blade 108 to run than the higher-impedance path offered by the cables 410 and the associated inductors 340. The lightning protection system 480 is a conductive pathway that runs from the tip 116 of the blade 108 (e.g., via a solid metal contact or a conductive cap at the tip 116) to the root 118 of the blade 108 (e.g., to a ferrule or conductive band that is electrically isolated from the cables 410) and is connected via a lightning current transfer unit 490 to ground via a conductive path through the tower 102.

The higher impedance presented by the inductors 340 offers a less attractive path to ground for the lightning than the lower impedance presented by the lightning protection system 480. The surge protection devices 470 are selectively activated or nonlinear devices that shunt current flow from the electrical leads 330 to the lightning protection system 480 in the event of a lightning strike or other electrical discharge to the blade 108. The surge protection devices 470 include one or more of: spark gaps, metal oxide varistors, gas discharge tubes, Transient Voltage Suppression (TVS) diodes, or other non-linear devices to shunt the current of a lightning strike or other electrical discharge away from the cables to the lightning protection system 480 when the voltage across the inductors 340 is sufficiently high.

The inductors 340 provide a common mode choke connection between the electrical panel 310 and the power source. As common mode chokes that are wound around a shared core, the inductors provide potential electrical paths with opposing impedances that cancel out to appear as a zero impedance link from the perspective of the power source, but appear as a high impedance link to the perspective of a powered system 320 or a lightning strike tipward of the electrical panel 310.

FIGS. 5A-6F illustrate various cross-sectional views of an LDFS that highlight various relative positions and arrangements of the inductors 340 in relation to the section of the root 118 used as a mandrel and the portions of the cables used to define the inductors 340. FIGS. 5A-5F illustrate the inductors 340 using the internal surface of the root 118 as a mandrel. FIGS. 6A-6F illustrate the inductors 340 using the external surface of the root as a mandrel. The portion of the root 118 illustrated in cross section in FIGS. 5A-6F is hollow and generally cylindrical in shape, although other shapes are contemplated and various supports and other components may be included in other portions of the root 118. FIGS. 5A-6F illustrate winding patterns using three cables 410a-c to produce three corresponding inductors 340a-c. In various embodiments, each of the individual three cables 410a-c may provide electrical inputs of a phase of power, a neutral line, or a ground line to an electrical panel 310, and a fabricator may select a winding pattern and designate any cable 410 to handle a particular electrical input according to the power requirements of the powered systems 320 in the blade 108.

Figure 5A:
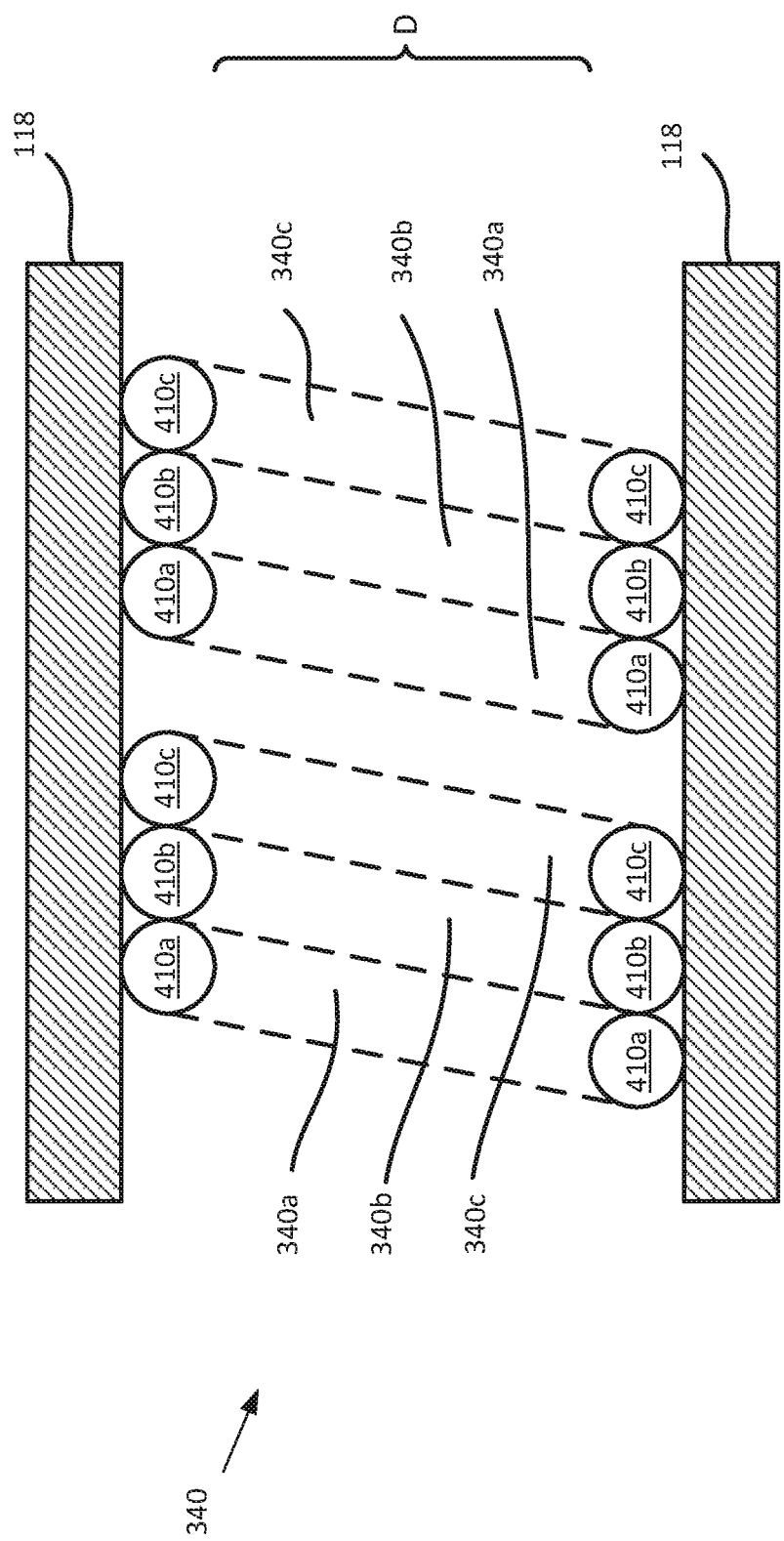
FIGS. 5A-5F illustrate the inductors using the internal surface of the root as a mandrel, according to embodiments of the present disclosure.
Figure 5B:
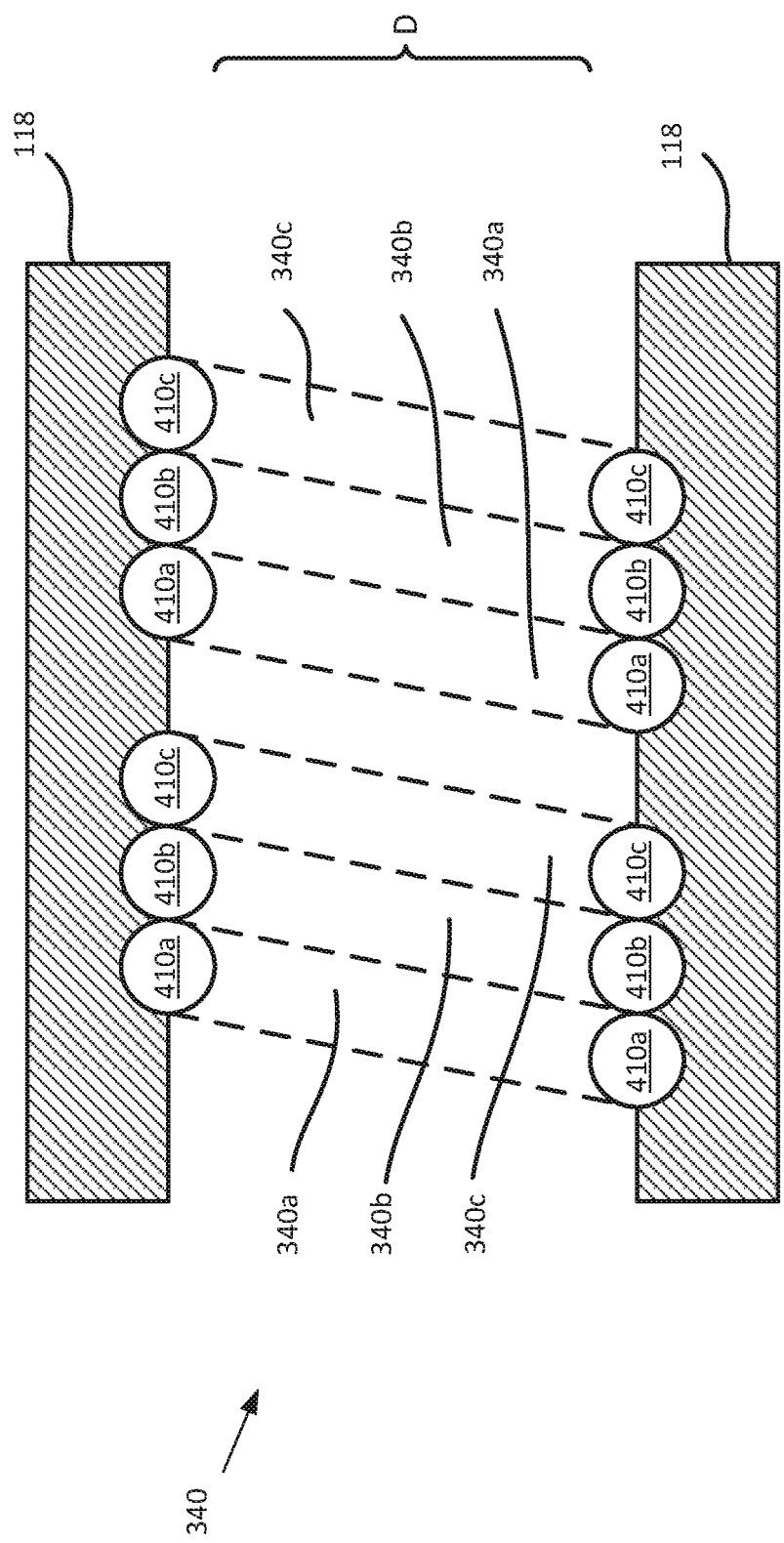

FIGS. 5A and 5B illustrate arrangements of the inductors 340 that are intertwined in which the inductors 340 are free from the material of the root 118 and at least partially secured by the material of the root 118, respectively. The first cable 410a, the second cable 410b, and the third cable 410c are wound into coils on the inner surface of the root 118 as a mandrel to form the respective inductors 340, and are wound sequentially to each other to produce intertwined inductors 340.

Figure 5C:
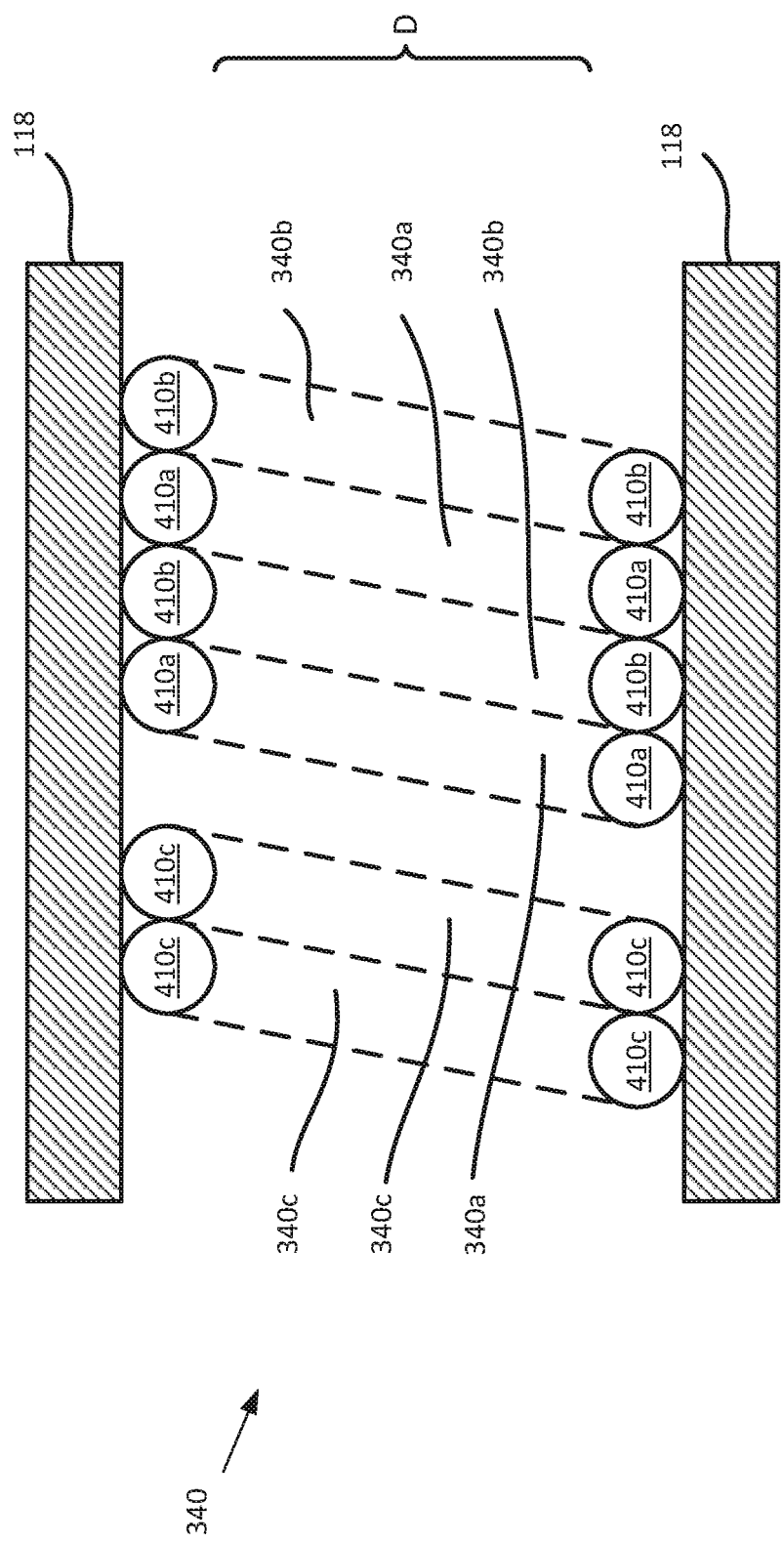
Figure 5D:
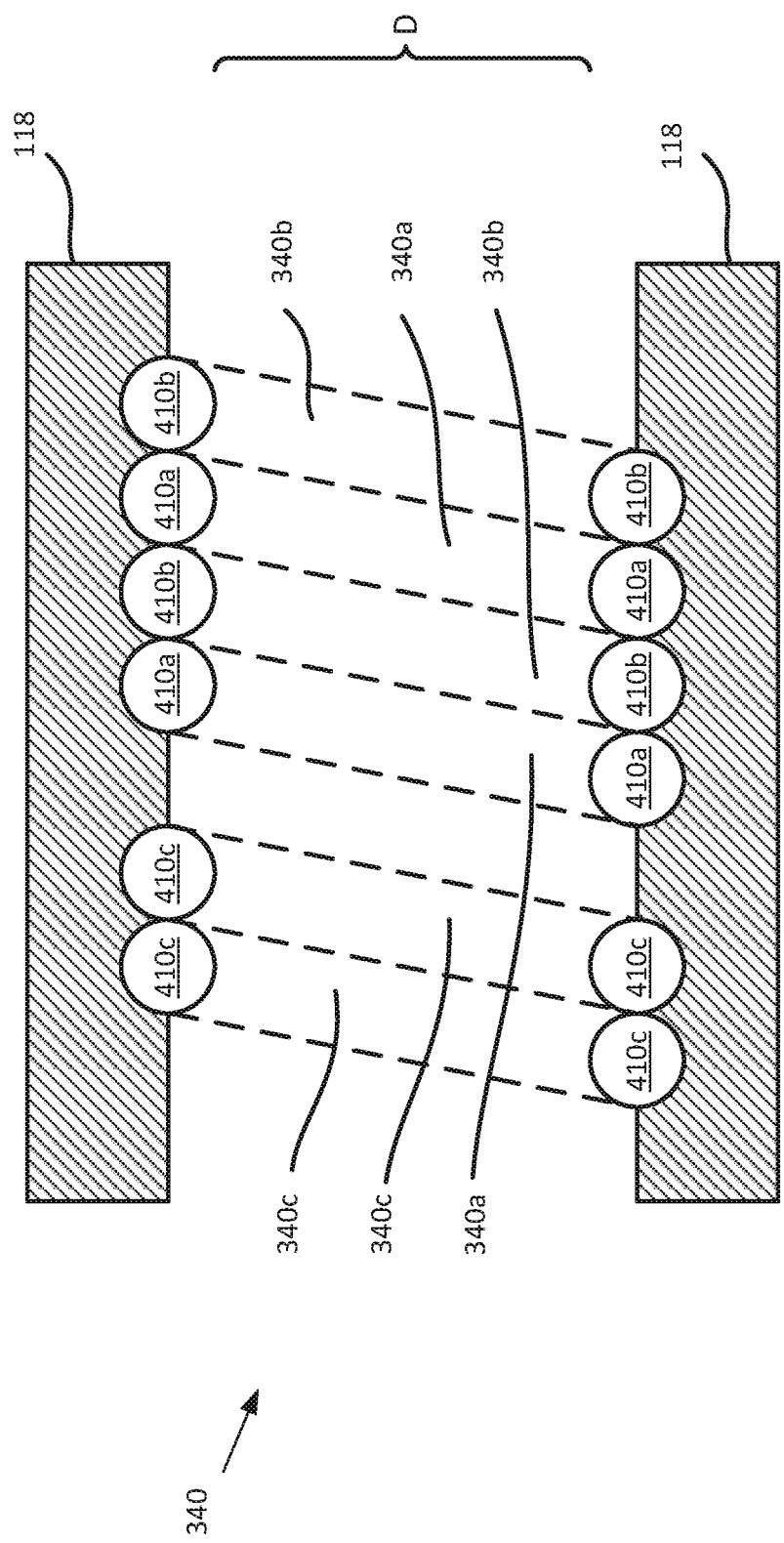

FIGS. 5C and 5D illustrate arrangements of the inductors 340 that wind the third cable 430 separately from the first and second cables 410a, 420b in which the inductors 340 are free from the material of the root 118 and at least partially secured by the material of the root 118, respectively. The first and second cables 410a, b are intertwined with one another, and the third cable 430c is wound separately. Winding the inductors 340 on an internal surface of the root 118, as in FIGS. 5A-5D, results in a diameter D (and associated radii) for the inductors 340 based on the internal diameter of the root 118 and the diameters of the first, second, and third cables 410a-c.

Figure 5E:
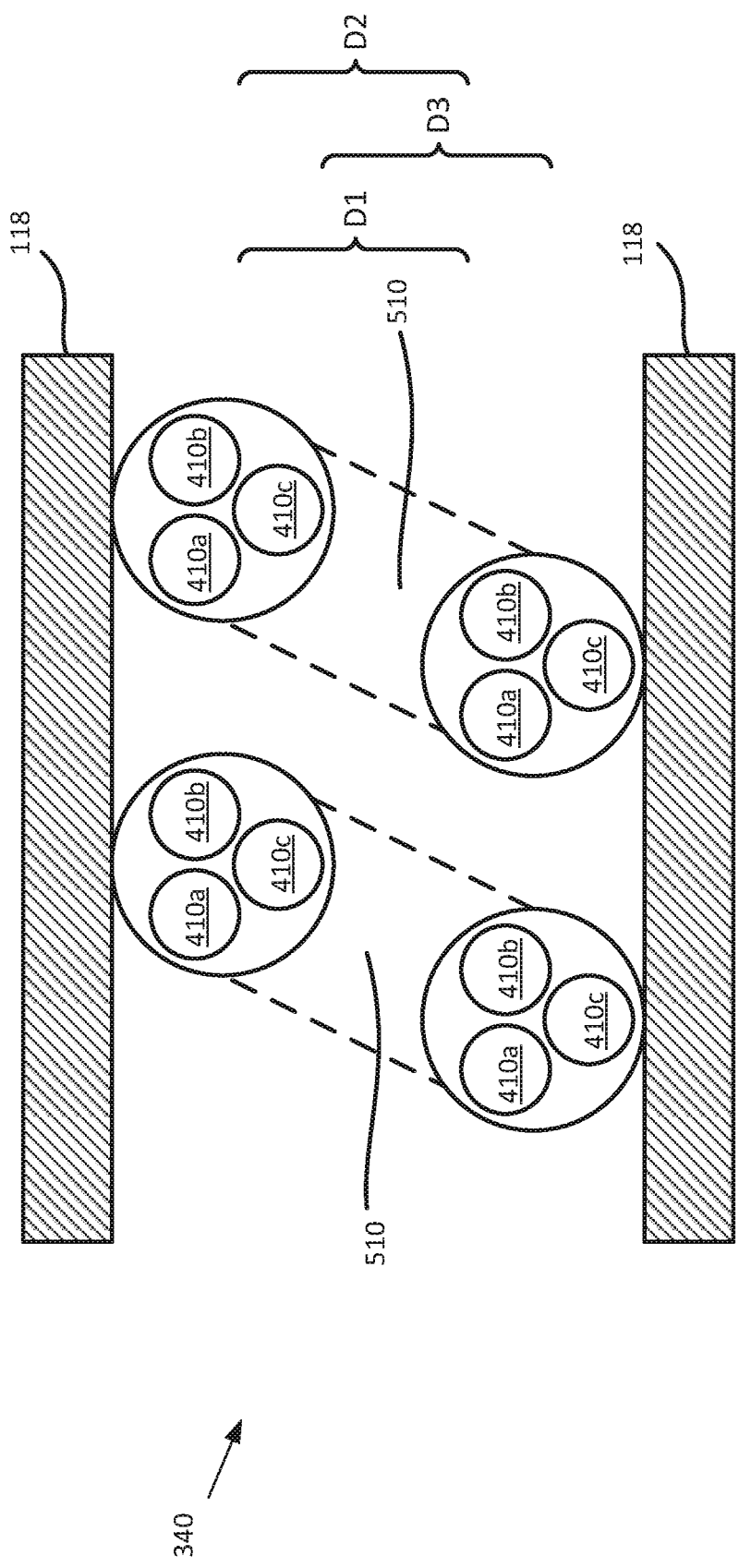
Figure 5F:
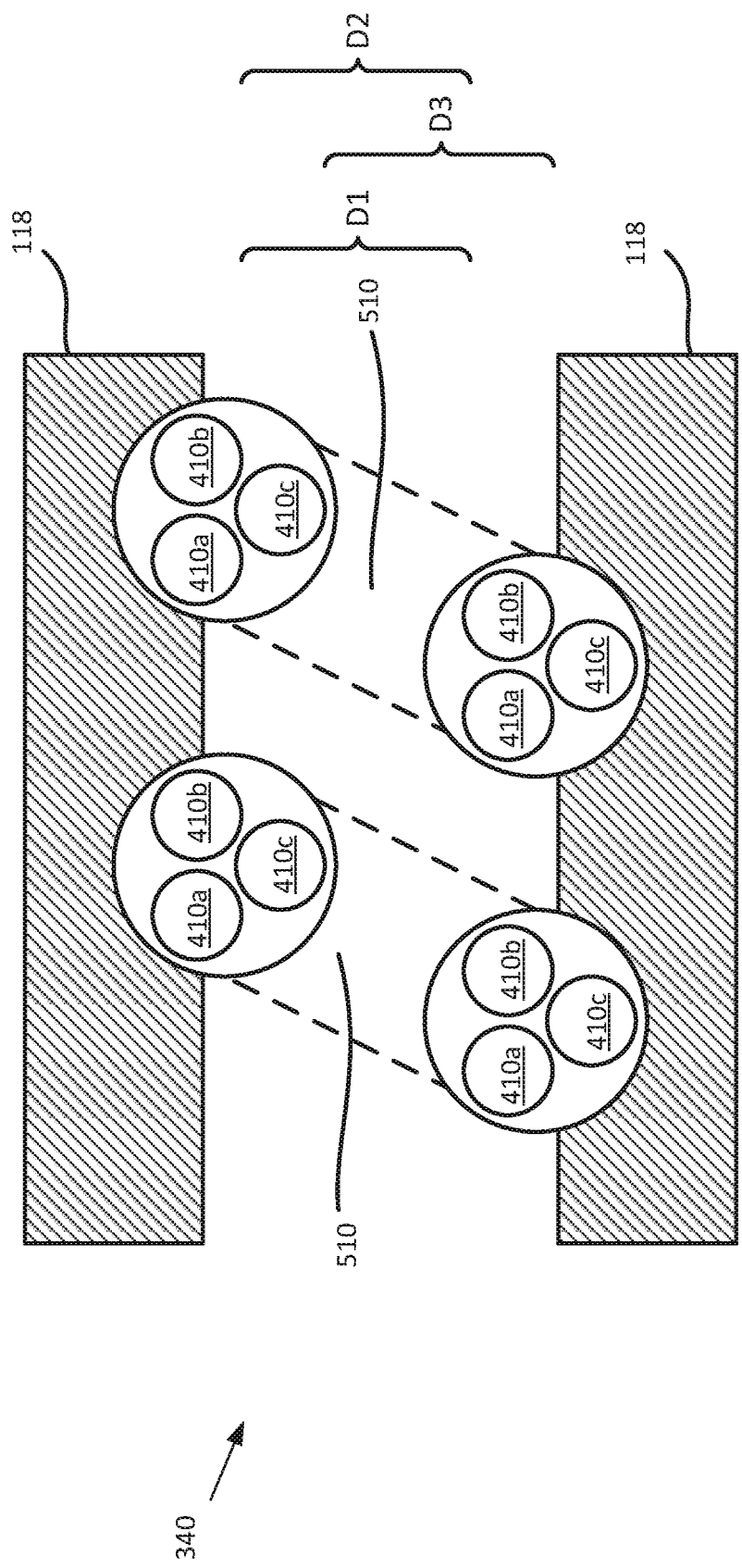

FIGS. 5E and 5F illustrate arrangements of the inductors 340 that employ a bundled cable 510 that includes the first, second, and third cables 410a-c as sub-cables defined therein. The bundled cable 510 is wound internally to the root 118 as a mandrel and imparts coils to each of the included first, second, and third cables 410a-c to form the inductors 340a-c. The interior distances between the individual cables 410 within the bundled cable 510 define individual diameters and associated radii that determine the inductance for the inductors 340 (i.e., D1 for the first cable 410a, D2 for the second cable 420b, and D3 for the third cable 430c). In various embodiments, D1=D2=D3, but in other embodiments, different diameters can be defined for the various cables 410 by altering the placement of the cables within the bundled cable 510 or altering the individual sizes of the cables 410.

In various embodiments, such as in FIGS. 5A, 5C, and 5E, one or more cable clamps (not illustrated) mounted to or built into the inner surface of the root 118 hold the wound cables in place to define the inductors. In other embodiments, such as in FIGS. 5B, 5D, and 5F, the body of the root 118 may secure a portion or all of the inductors 340. For example, FIG. 5A (or 5C or 5E) may be an alternative point of view of the cross section presented in FIG. 5B (or 5D or 5F, respectively) rotated by a predefined angle of view.

Figure 6A:
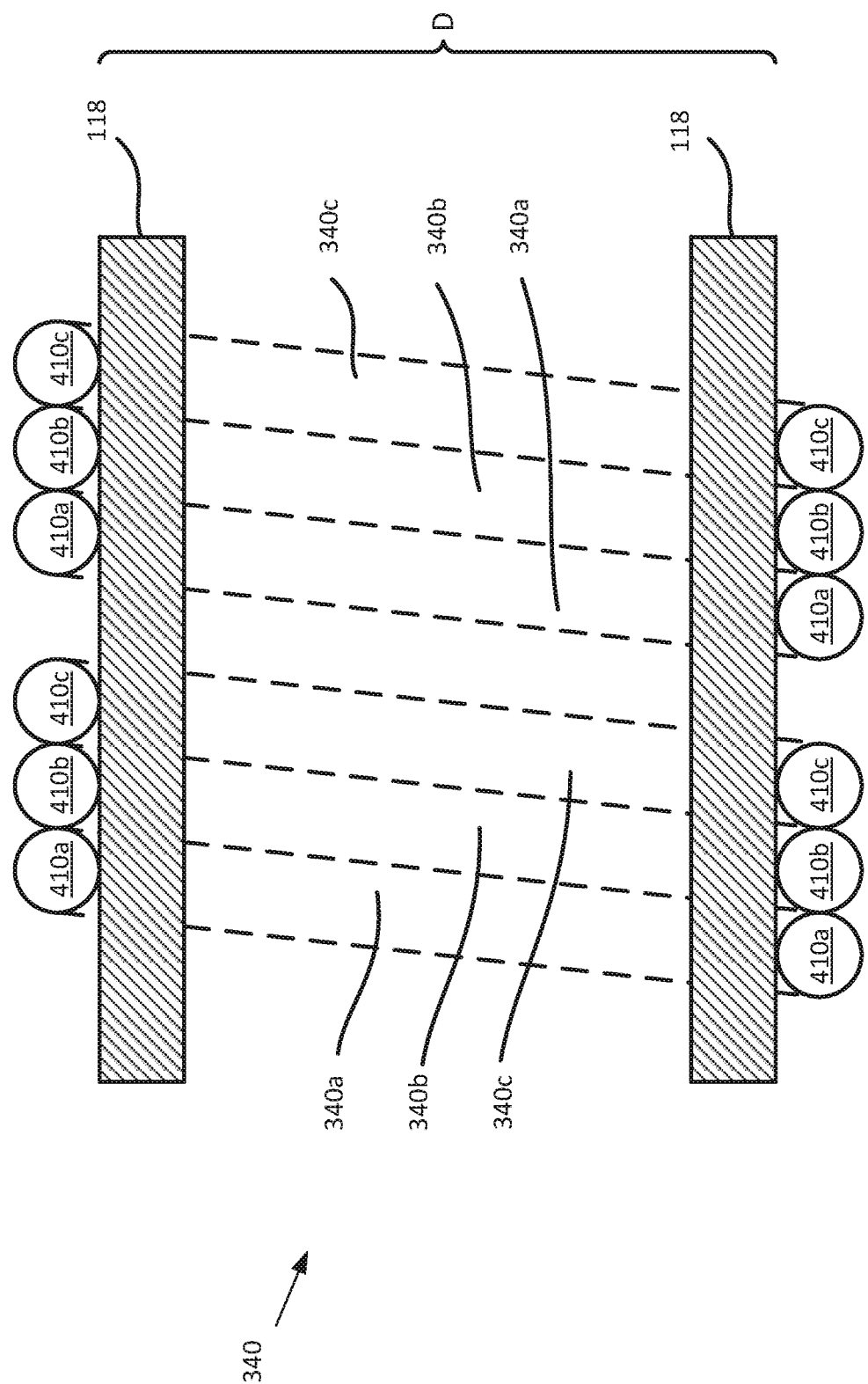
FIGS. 6A-6F illustrate the inductors using the external surface of the root as a mandrel, according to embodiments of the present disclosure.
Figure 6B:
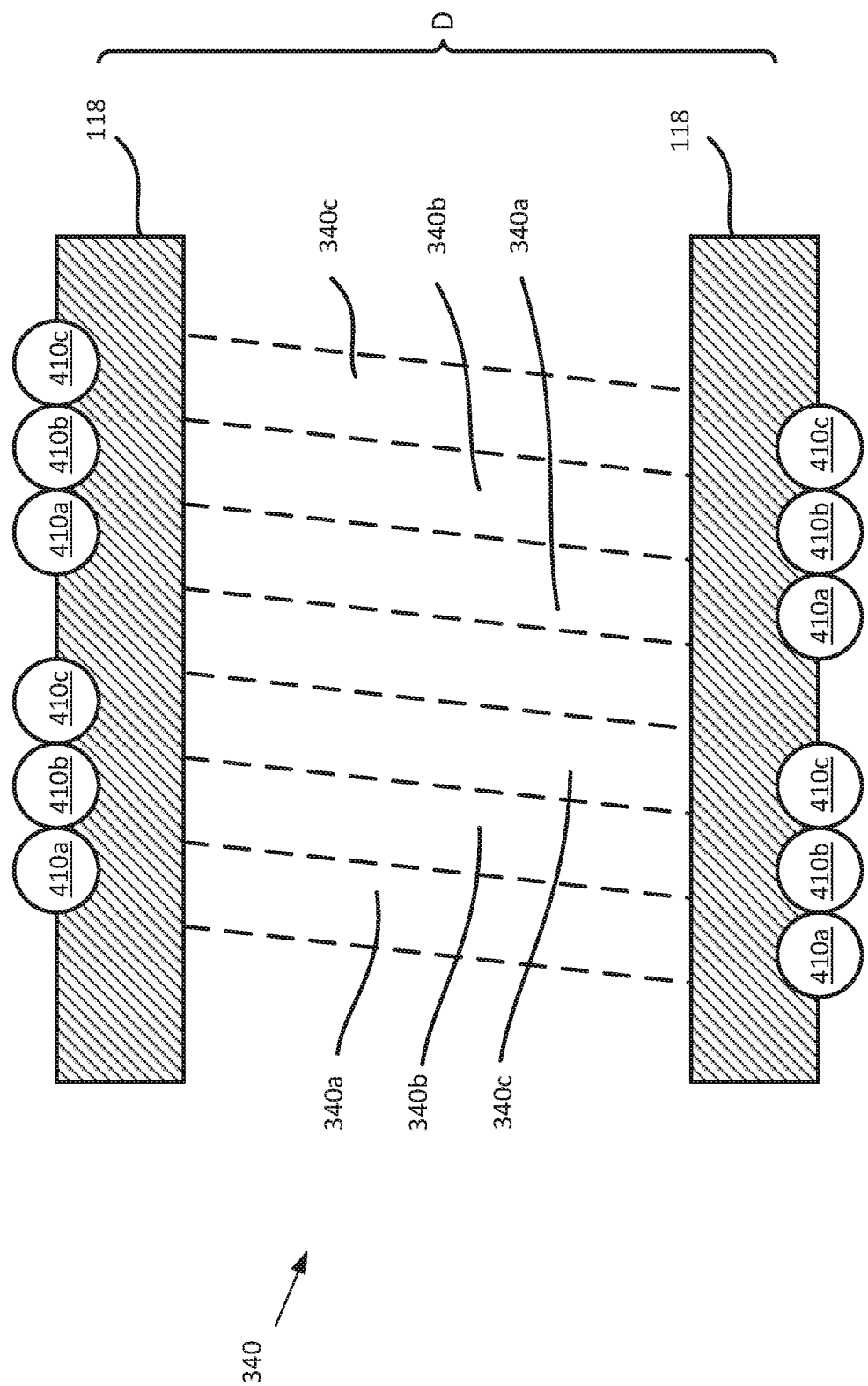

FIGS. 6A and 6B illustrate arrangements of the inductors 340 that are intertwined in which the inductors 340 are free from the material of the root 118 and at least partially secured by the material of the root 118, respectively. The first cable 410a, the second cable 410b, and the third cable 410c are wound into coils on the outer surface of the root 118 as a mandrel to form the respective inductors 340, and are wound sequentially to each other to produce intertwined inductors 340.

Figure 6C:
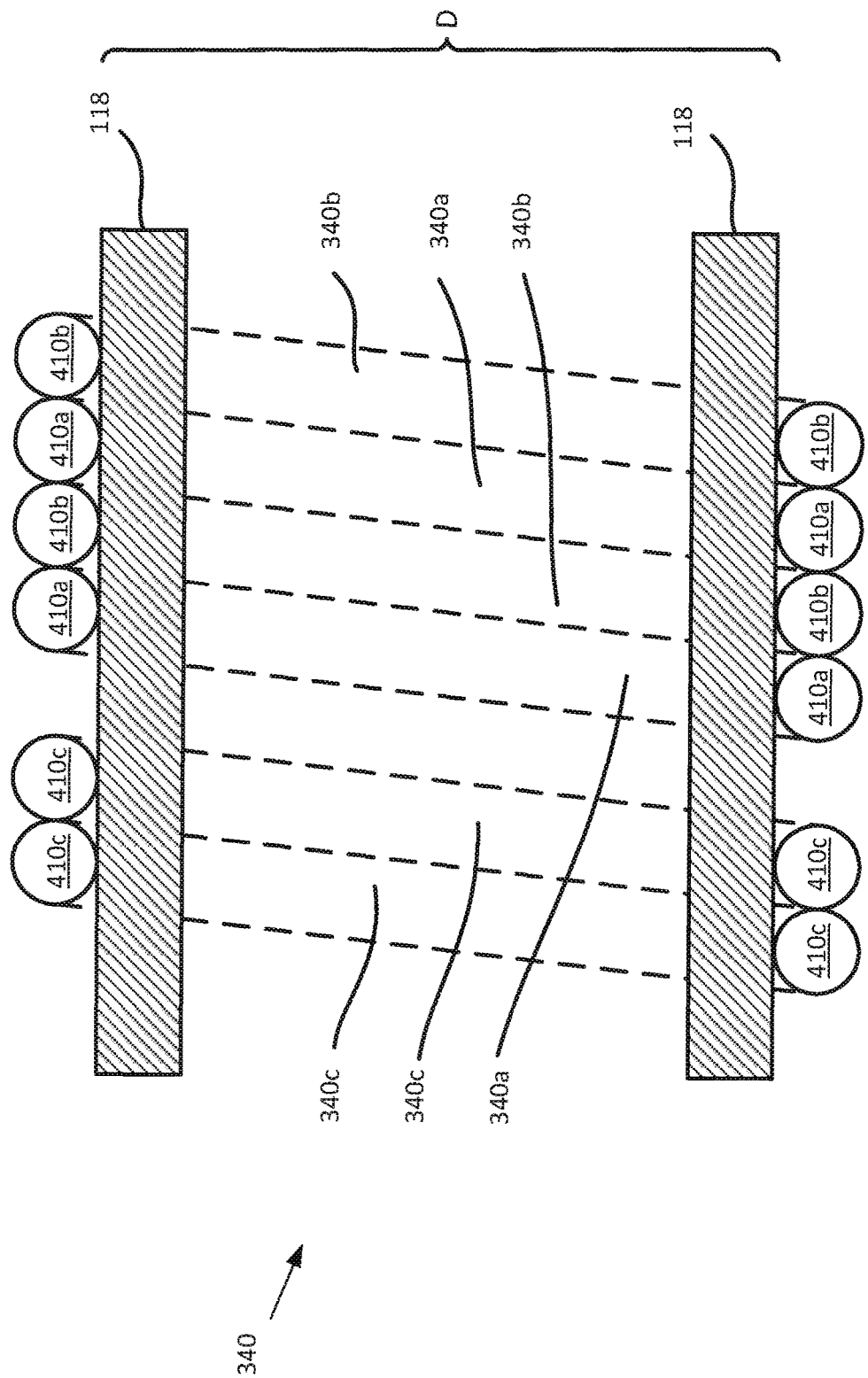
Figure 6D:
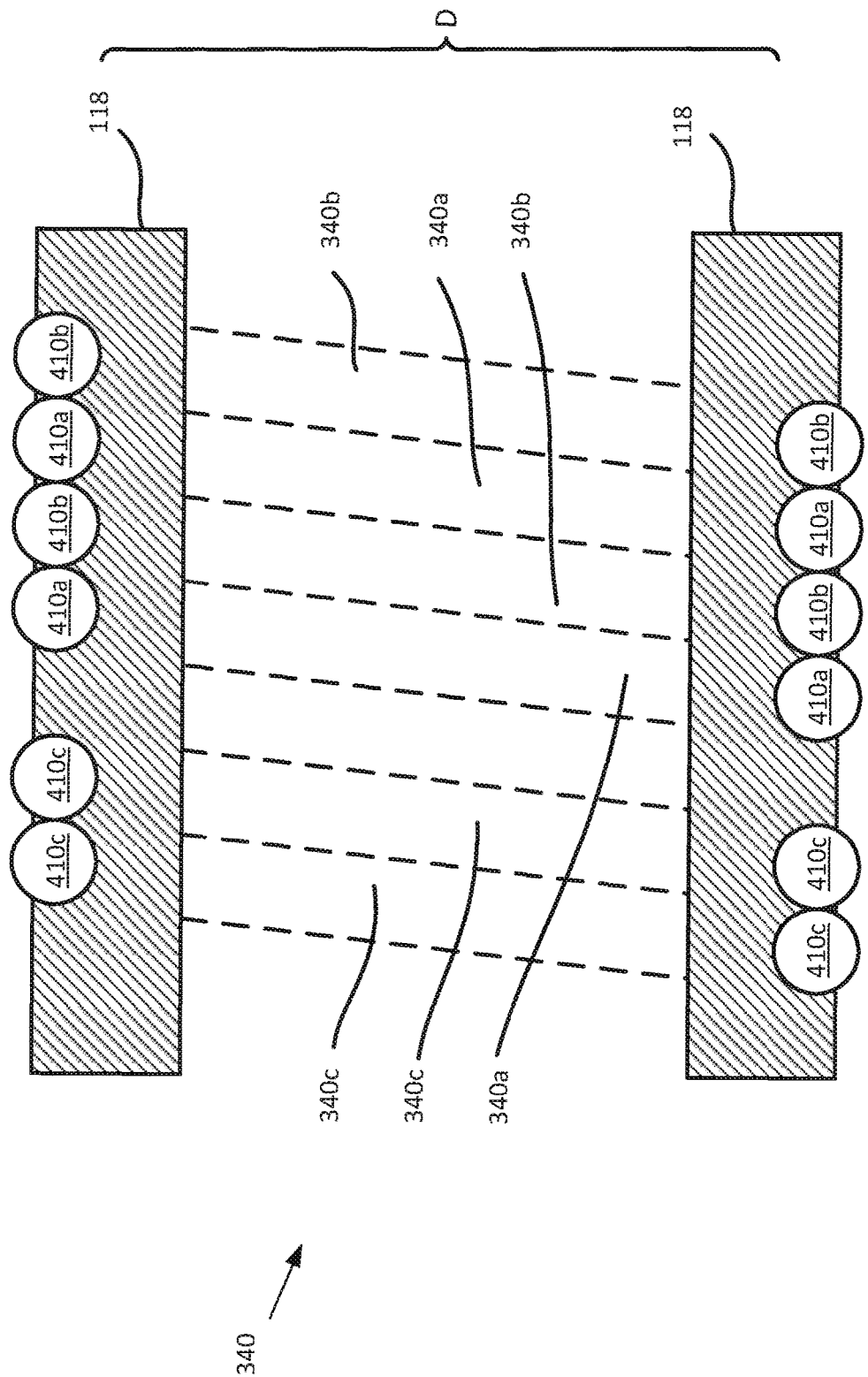

FIGS. 6C and 6D illustrate arrangements of the inductors 340 that wind the third cable 430 separately from the first and second cables 410a,b in which the inductors 340 are free from the material of the root 118 and at least partially secured by the material of the root 118, respectively. The first and second cables 410a,b are intertwined with one another, and the third cable 410c is wound separately. Winding the inductors 340 on an outer surface of the root 118, as in FIGS. 6A-6D, results in a diameter D (and associated radii) for the inductors 340 based on the external diameter of the root 118 and the diameters of the first, second, and third cables 410a-c.

Figure 6E:
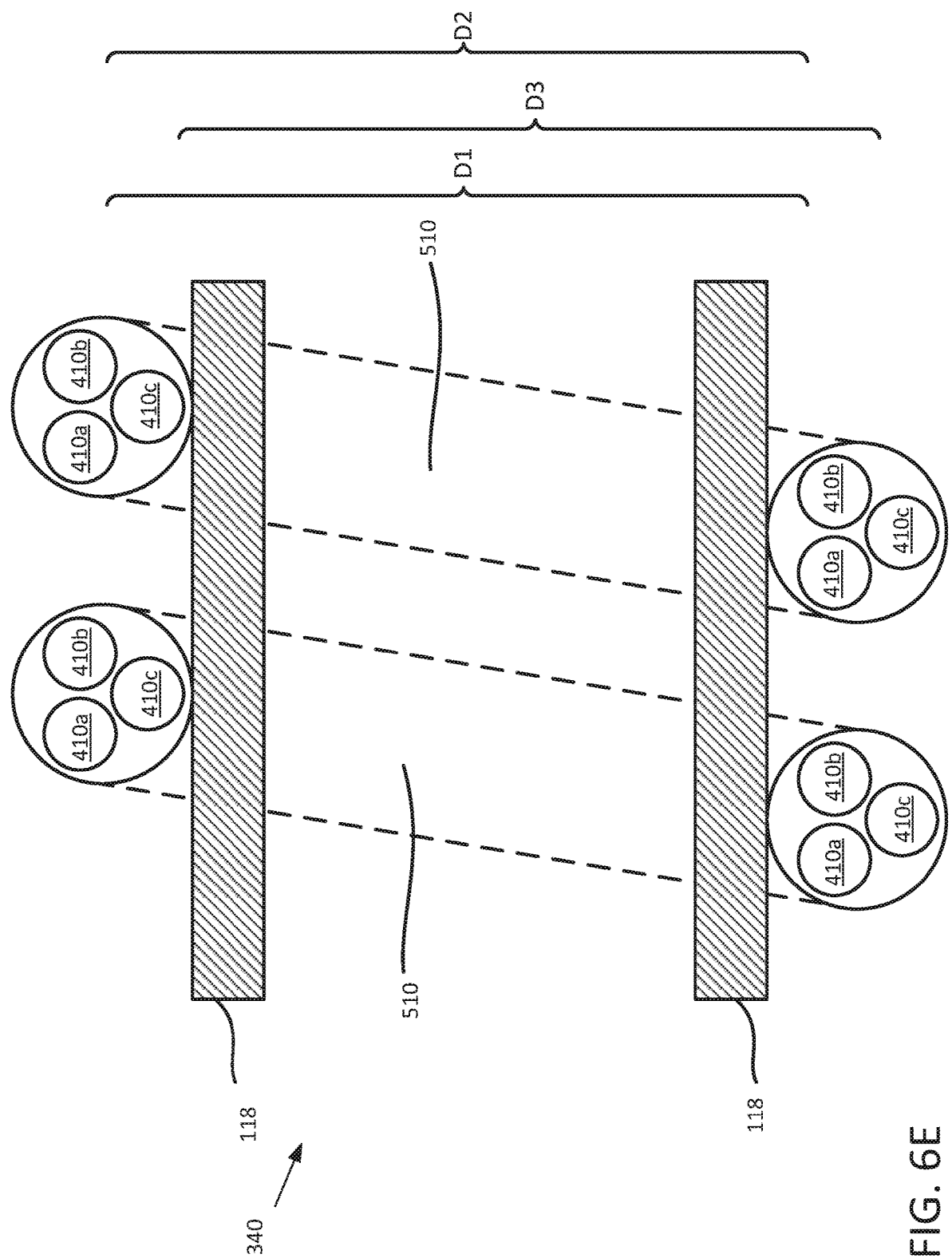
Figure 6F:
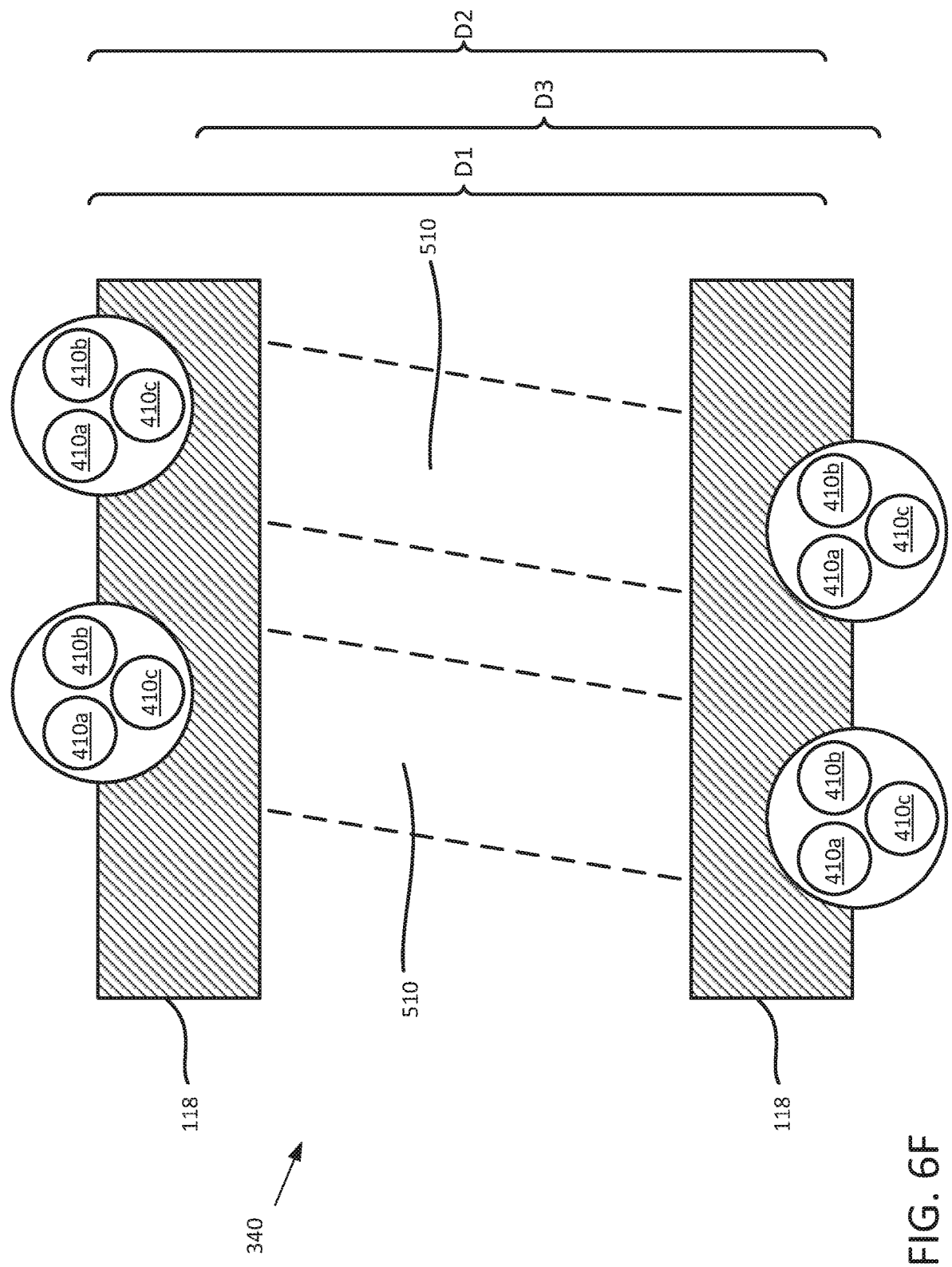

FIGS. 6E and 6F illustrate arrangements of the inductors 340 that employ a bundled cable 510 that includes the first, second, and third cables 410a-c as sub-cables defined therein. The bundled cable 510 is wound externally to the root 118 as a mandrel and imparts coils to each of the included first, second, and third cables 410a-c to form the inductors 340. The interior distances between the individual cables 410a-c within the bundled cable 510 define individual diameters and associated radii that determine the inductance for the inductors 340 (i.e., D1 for the first cable 410a, D2 for the second cable 410b, and D3 for the third cable 410c). In various embodiments, D1=D2=D3, but in other embodiments, different diameters can be defined for the various cables 410a-c by altering the placement of the cables within the bundled cable 510 or altering the individual sizes of the cables 410.

In various embodiments, such as in FIGS. 6A, 6C, and 6E, one or more cable clamps (not illustrated) mounted to or built into the outer surface of the root 118 hold the wound cables in place to define the inductors 340. In other embodiments, such as in FIGS. 6B, 6D, and 6F, the body of the root 118 may secure a portion or all of the inductors 340. For example, FIG. 6A (or 6C or 6E) may be an alternative point of view of the cross section presented in FIG. 6B (or 6D or 6F, respectively) rotated by a predefined angle of view. Although not illustrated, the externally wound inductors 340 may be covered by a protective cap and/or covered by a cowl or other portion of the hub 110 when the root 118 is installed to the hub 110, and are electrically isolated from the lightning protection system 480. The cables 410a-c of the externally defined inductors 340 may enter and exit the blade 108 via various through-holes (not illustrated) defined in the body of the root 118.

A fabricator may determine whether to install the cables 410 internally (e.g., as in FIGS. 5A-5F) or externally (e.g., as in FIGS. 6A-6F) based on the different potential internal/external diameters for the inductors 340, the structural strength of the root 118 (e.g., including the effect of through-holes on structural soundness), mounting hardware used between the blade root 118 and the hub 110, the permeability of the material used for the root 118, etc., to result in inductors 340 of a desired inductance and with desired physical properties. Accordingly, a fabricator can deploy large-scale inductors 340 made from the cables 410 supplying an electrical panel 310 as an LDFS with greater heat dissipation potential, a lower rotational moment, and less material than an LDFS using internal discrete inductors.

FIGS. 7A-7D illustrate additional cable winding patterns for an LDFS using four cables 410a-d to produce four corresponding inductors 340a-d. As will be appreciated, the cable winding patterns shown in FIGS. 7A-7D do not show the relative positions of the cables 410 of the root 118 used as a mandrel for the inductors 340; the cable winding patterns may be used with internal windings (e.g., as in FIGS. 5A-5F) or external windings (e.g. as in FIGS. 6A-6F), and may be fully, partially, or not captured in the material of the root 118 in various embodiments. In various embodiments, each of the individual four cables 410*a-d* may provide electrical inputs of a phase of power, a neutral line, or a ground line to an electrical panel 310, and a fabricator may select a winding pattern and designate any cable 410 to handle a particular electrical input according to the power requirements of the powered systems 320 in the blade 108.

Figure 7A:
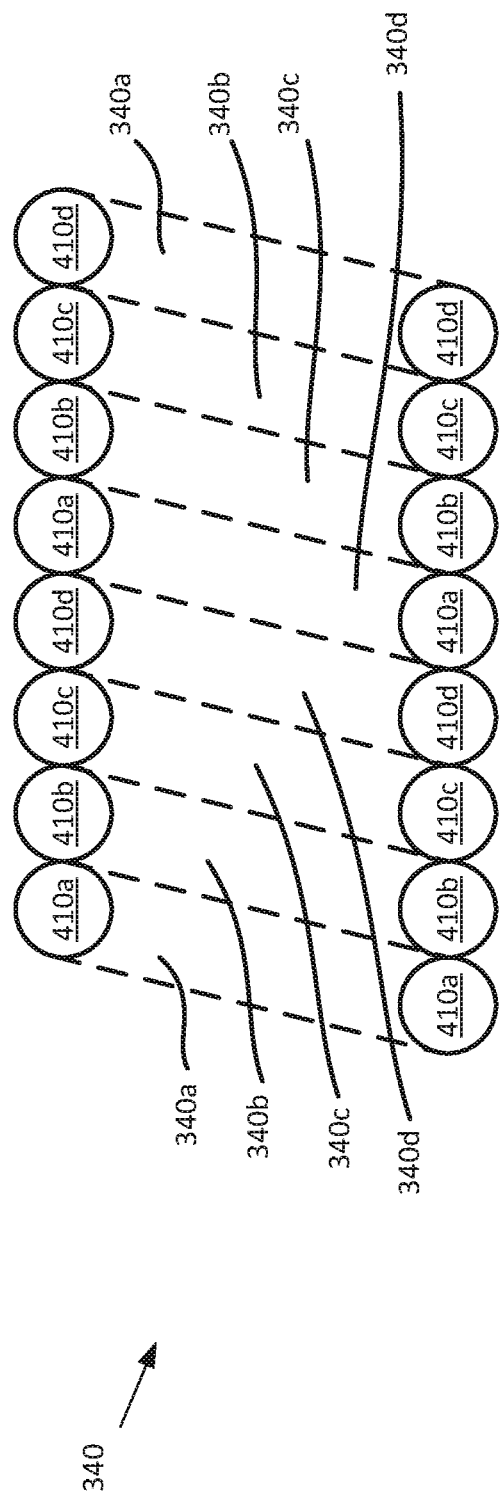
FIGS. 7A-D illustrate additional cable winding patterns for a Lightning Discharge Filter System using four cables to produce four corresponding inductors, according to embodiments of the present disclosure.
Figure 7B:
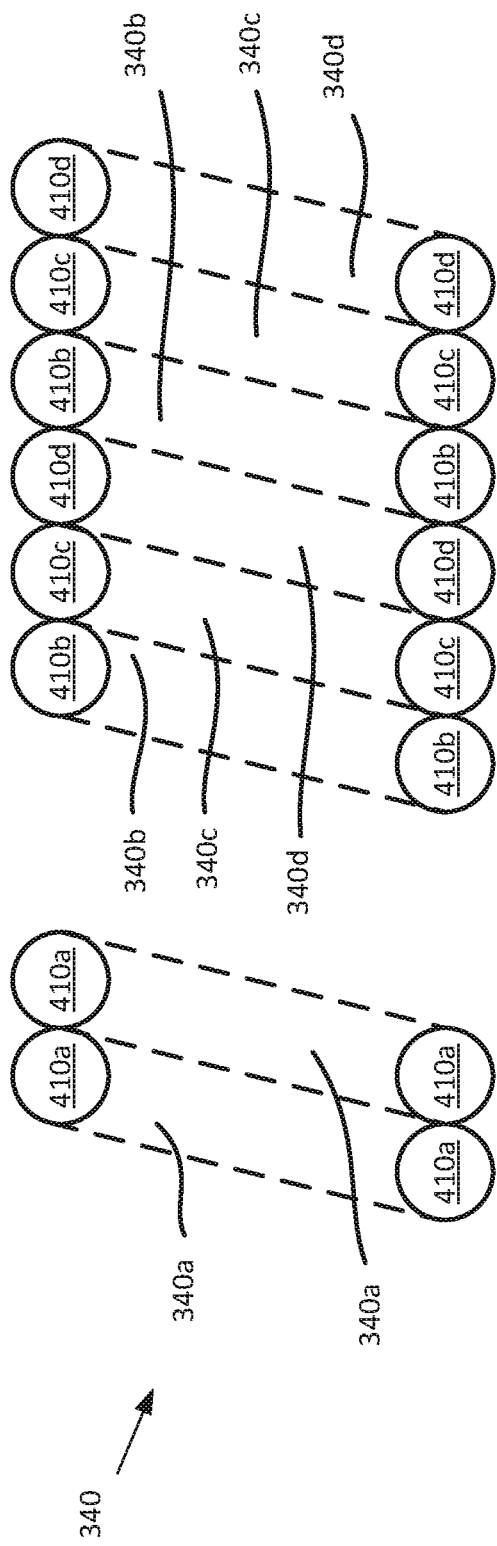
Figure 7C:
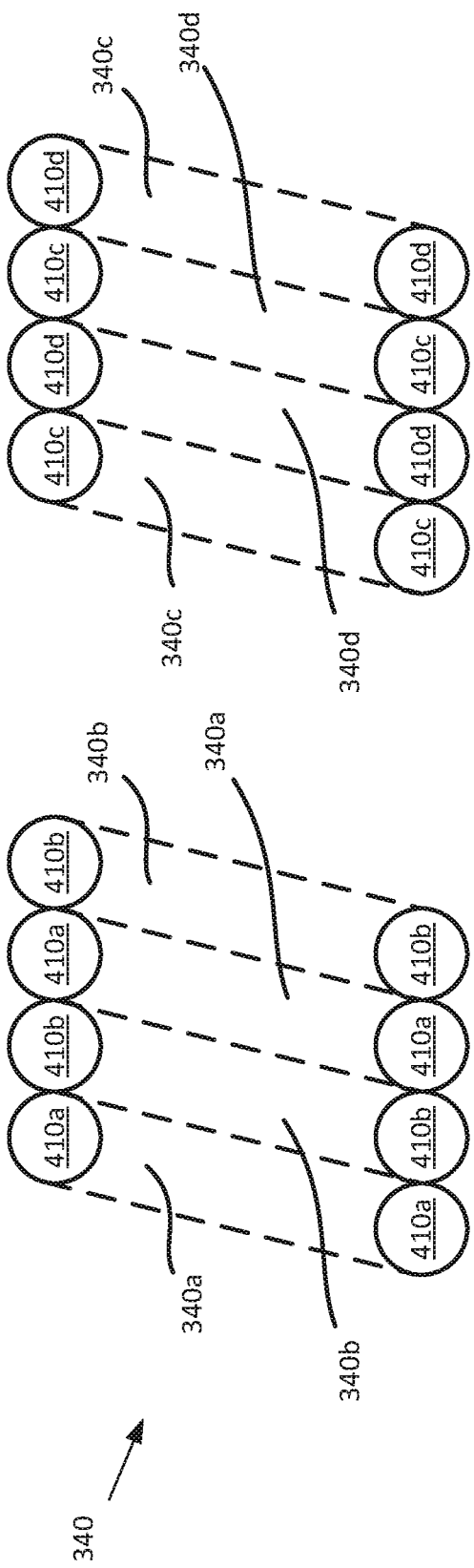
Figure 7D:
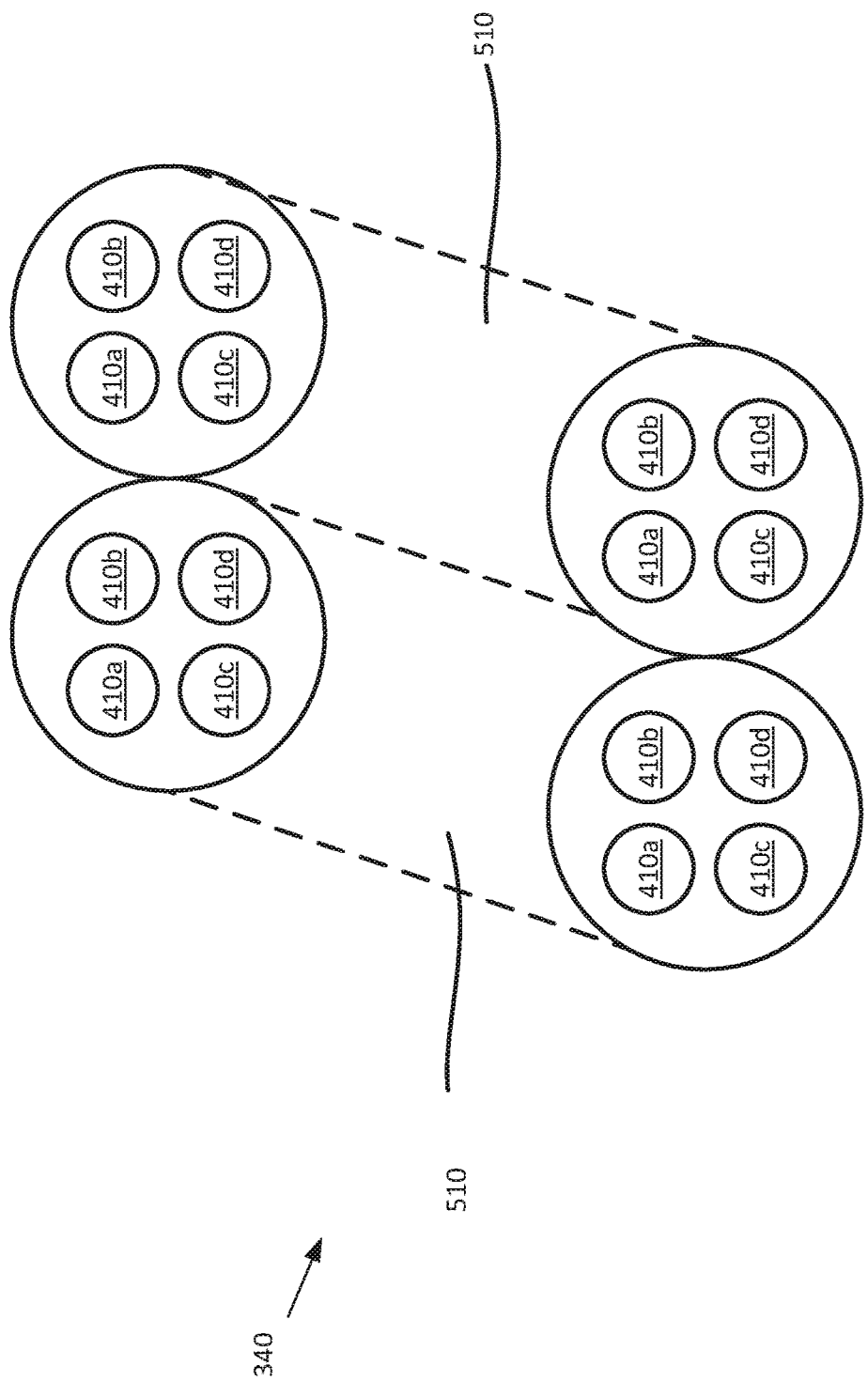

FIG. 7A illustrates that the four cables 410*a-d* may be co-wound about the mandrel to produce the four inductors 340*a-d*. FIG. 7B illustrates that a first cable 410*a* (e.g., carrying a ground electrical input) may be wound separately into a first inductor 340*a* about a shared mandrel from the second through fourth cables 410*b-d* (e.g., carrying two phases of power and neutral, or three phases of power), which are co-wound about the mandrel with one another to produce the second through fourth inductors 340*b-d*. FIG. 7C illustrates that a first and a second cable 410*a,b* may be co-wound about a shared mandrel to form a first common mode choke with the first and second inductors 340*a,b* separately from a third and a fourth cable 410*c,d* that are co-wound with one another about the mandrel to form a second common mode choke with the third and fourth inductors 340*c,d*. FIG. 7D illustrates that a bundled cable 510 may include the first through fourth cables 410*a-d* as sub-cables thereof, which are wound about the mandrel to produce the inductors 340.

FIGS. 8A-8E illustrate additional cable winding patterns for an LDFS using five cables 410*a-e* to produce five corresponding inductors 340*a-e*. As will be appreciated, the cable winding patterns shown in FIGS. 8A-8E do not show the relative positions of the cables 410 of the root 118 used as a mandrel for the inductors 340; the cable winding patterns may be used with internal windings (e.g., as in FIGS. 5A-5F) or external windings (e.g. as in FIGS. 6A-6F), and may be fully, partially, or not captured in the material of the root 118 in various embodiments. In various embodiments, each of the individual five cables 410*a-e* may provide electrical inputs of a phase of power, a neutral line, or a ground line to an electrical panel 310, and a fabricator may select a winding pattern and designate any cable 410 to handle a particular electrical input according to the power requirements of the powered systems 320 in the blade 108.

Figure 8A:
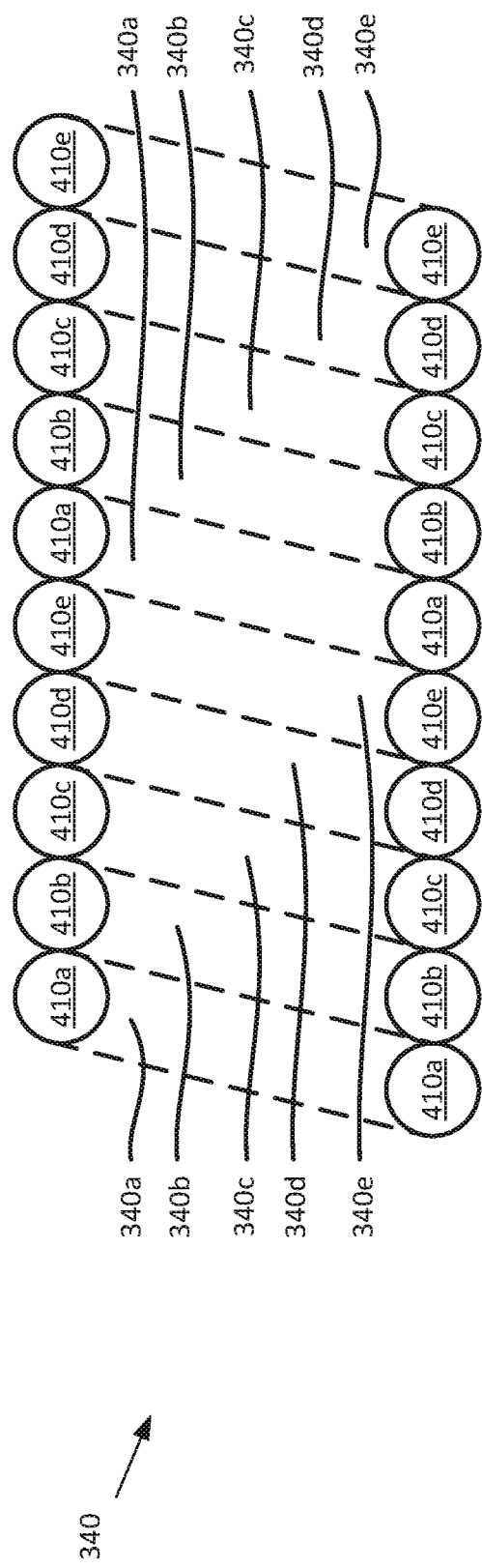
FIGS. 8A-8E illustrate additional cable winding patterns for a Lightning Discharge Filter System using five cables to produce five corresponding inductors, according to embodiments of the present disclosure.
Figure 8B:
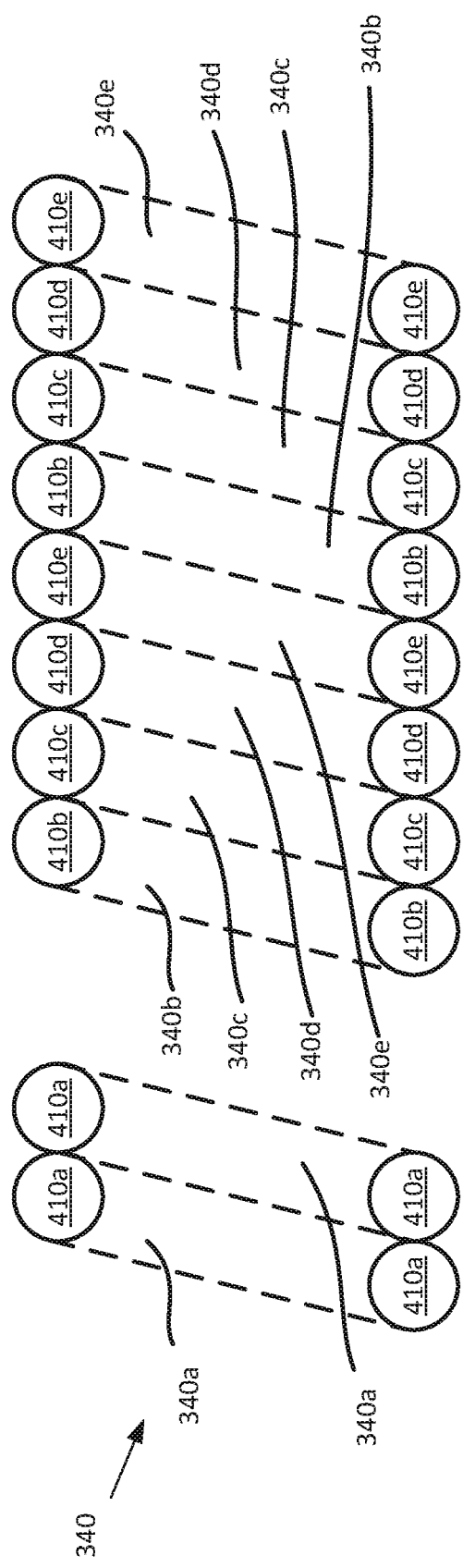
Figure 8C:
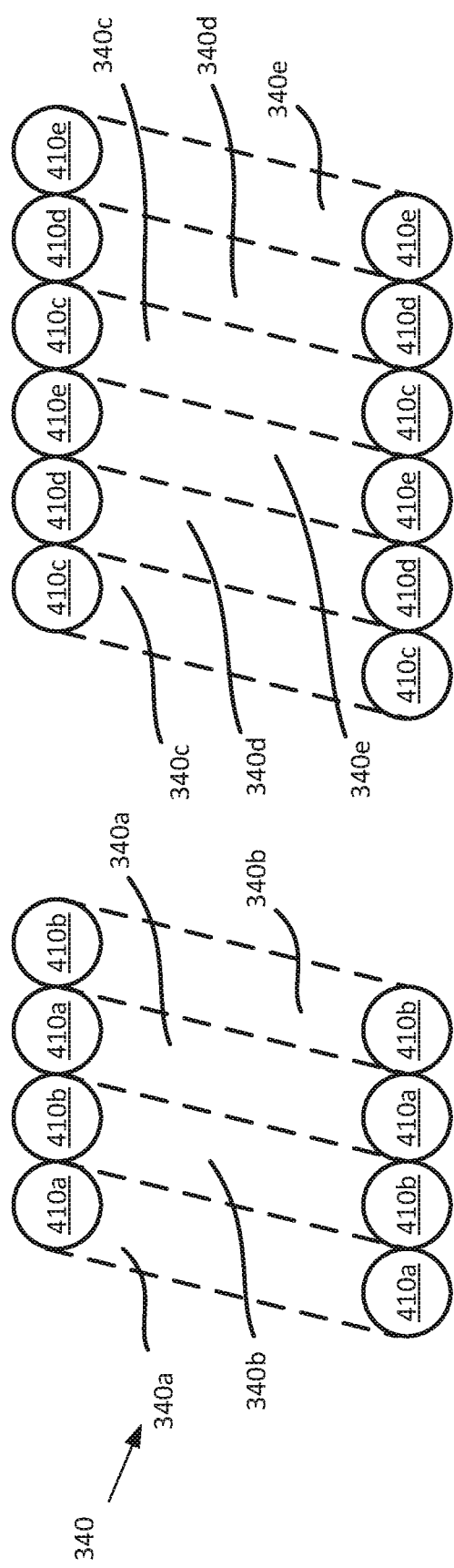
Figure 8D:
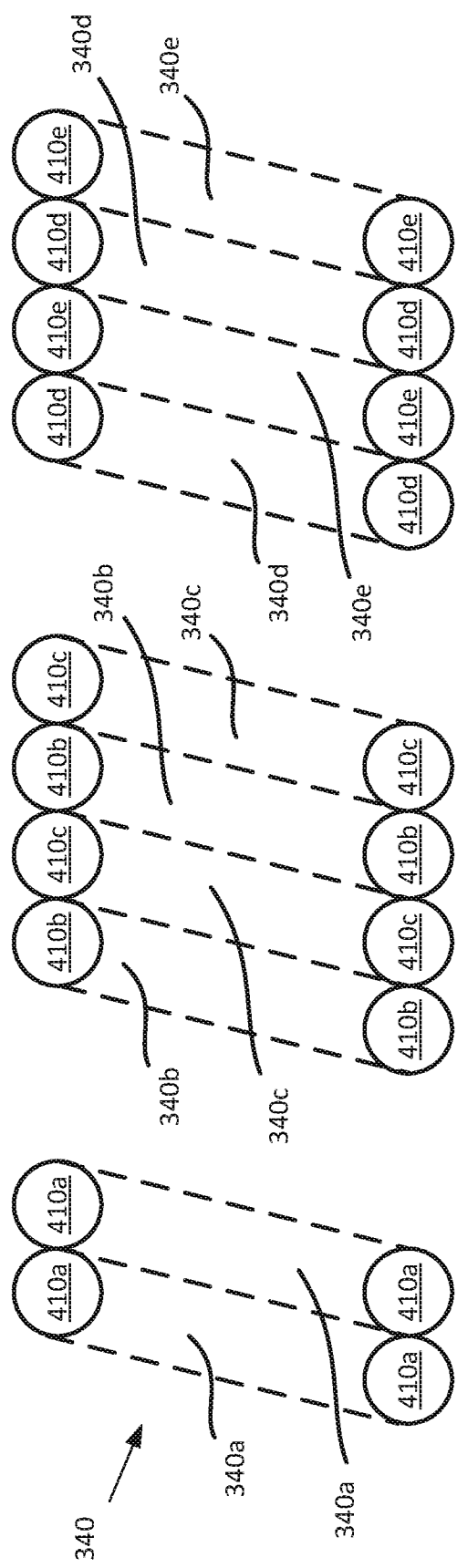
Figure 8E:
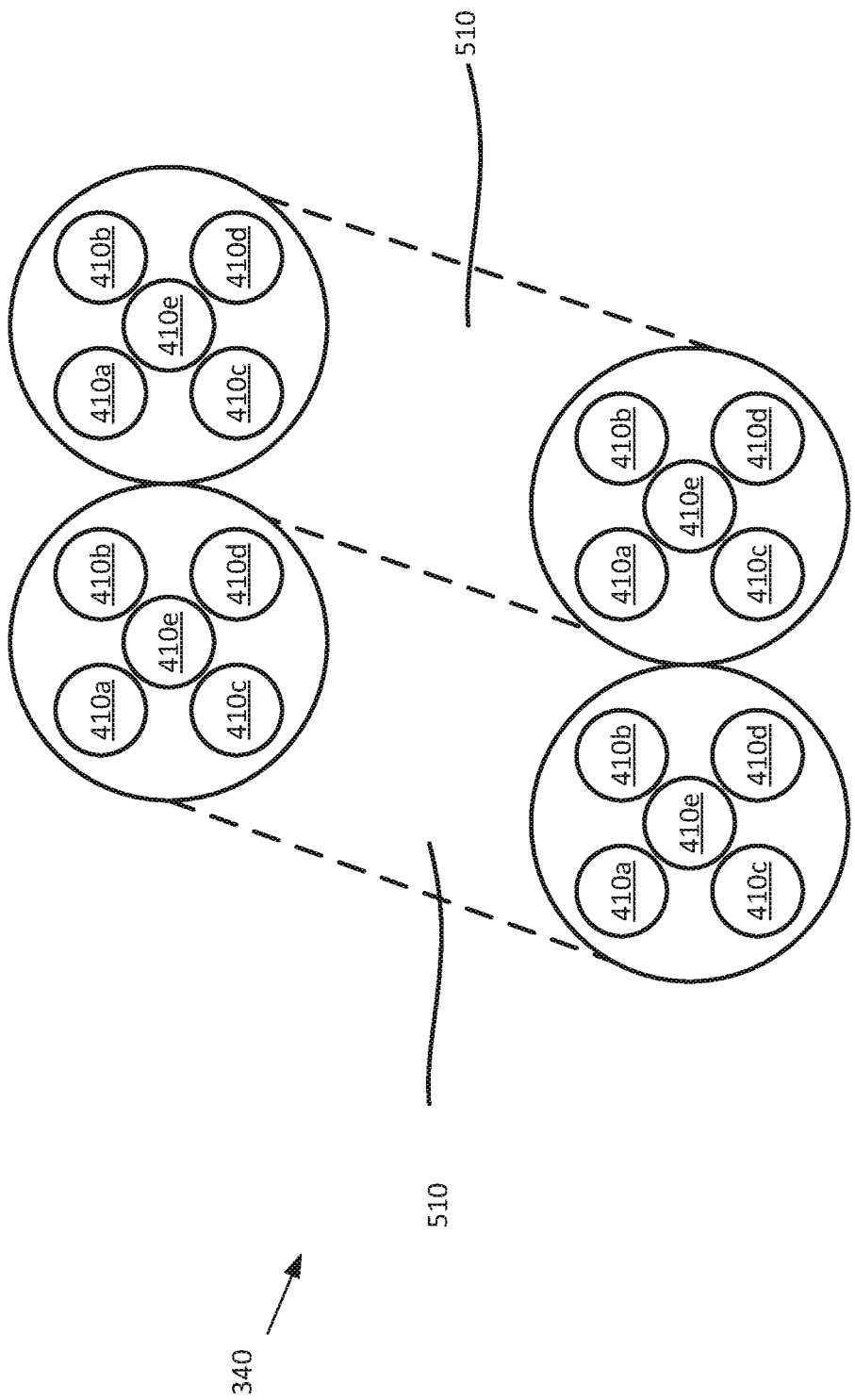

FIG. 8A illustrates that the five cables 410*a-e* may be co-wound about the mandrel to produce the five inductors 340*a-e*. FIG. 8B illustrates that a first cable 410*a* (e.g., carrying a ground electrical input) may be wound separately into a first inductor 340*a* about a shared mandrel from the second through fifth cables 410*b-e* (e.g., carrying three phases of power and neutral), which are co-wound about the mandrel with one another to produce the second through fifth inductors 340*b-e*. FIG. 8C illustrates that a first and a second cable 410*a,b* may be co-wound about a shared mandrel to form a first common mode choke with the first and second inductors 340*a,b* separately from the third through fifth cables 410*c-e* that are co-wound with one another about the mandrel to form a second common mode choke with the third through fifth inductors 340*c-e*. FIG. 8D illustrates that the five cables 410 may be wound into the associated inductors 340 in three separate groups, in which the first cable 410*a* is wound into a first inductor 340*a* by itself, the second and third cables 410*b,c* are co-wound to form a first common mode choke with the second and third inductors 340*b,c*, and the fourth and fifth cables 410*d,e* are co-wound to form a second common mode choke with the fourth and fifth inductors 340*d,e*. FIG. 8E illustrates that a bundled cable 510 may include the first through fifth cables 410*a-e* as sub-cables thereof, which are wound about the mandrel to produce the inductors 340. Throughout the present disclosure, reference is made to embodiments presented. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described herein are merely illustrative and are not considered elements or limitations of the appended claims except where explicitly recited in a claim(s).

In view of the foregoing, the scope of the present disclosure is determined by the claims that follow.

What is claimed is:

1. A wind turbine blade, comprising:
   a discharge filter, located on a root of the wind turbine blade, including a first cable wound into a first inductor using the root as a mandrel;
   a powered system, located in a body of the wind turbine blade; and
   an electrical panel, located between the discharge filter and the powered system in the body of the wind turbine blade, wherein the first cable is configured to provide power to the powered system through the electrical panel.

2. The wind turbine blade of claim 1, wherein the mandrel is an exterior surface of the root.

3. The wind turbine blade of claim 1, wherein the mandrel is an interior surface of the root.

4. The wind turbine blade of claim 1, wherein the first inductor is at least partially embedded in a material comprising the root.

5. The wind turbine blade of claim 1, wherein the first cable is a bundled cable including a live line, a neutral line, and a protective earth line.

6. The wind turbine blade of claim 1, wherein the discharge filter further includes:
   a second cable wound into a second inductor using the root as a mandrel; and
   a third cable wound into a third inductor using the root as a mandrel.

7. The wind turbine blade of claim 1, wherein a pathway between the first cable and the powered system is linked via a surge protection device to a lightning protection system offering a lower impedance path to ground than the first cable.

8. The wind turbine blade of claim 1, wherein the electrical panel receives at an input:
   the first cable;
   a second cable and a third cable;
   wherein the discharge filter is located between a power source and the electrical panel in the root of the blade.

9. The wind turbine blade of claim 1, wherein the root is a hollow cylinder.

10. The wind turbine blade of claim 8, wherein the electrical panel further receives a fourth cable at the input, and the discharge filter further comprises:

a fourth inductor, comprising a portion of the fourth cable wound around the root as a mandrel.

11. The wind turbine blade of claim 10, wherein the electrical panel further receives a fifth cable at the input, and the discharge filter further comprises:
a fifth inductor, comprising a portion of the fifth cable wound around the root as a mandrel.

12. The wind turbine blade of claim 6, wherein the first cable, the second cable, and the third cable are included in a single bundled cable wound into a bundled inductor.

13. The wind turbine blade of claim 6, wherein the first inductor is intertwined with the second inductor.

14. The wind turbine blade of claim 6, wherein the first inductor, the second inductor, and the third inductor are wound sequentially about the root.

15. A wind turbine, comprising:
a plurality of blades, wherein each blade of the plurality of blades is electrically connected to a power source via rotatable contacts in a nacelle from which a root of the blade extends towards a tip of the blade, each blade comprising:
a first cable, electrically connected to the power source via the nacelle, and wound into a first inductor supported by a diameter of the root and connected to an input of an electrical panel; and
a powered system, connected to an output of the electrical panel via an electrical lead and located tipward of the electrical panel.

16. A wind turbine according to claim 15, comprising:
a second cable, electrically connected to the power source via the nacelle, and wound into a second inductor supported by the diameter of the root and connected to the input of the electrical panel; and
a third cable, electrically connected to protective earth via the nacelle, and wound into a third inductor supported by the diameter of the root and connected to the input of the electrical panel.

17. A wind turbine according to claim 16, comprising:
a lighting protection system, that is electrically isolated from the first cable, the second cable, and the third cable in the blade, that is connected to ground via the nacelle, and that is selectively connected to the electrical panel, wherein when electrically connected to the electrical panel, the lightning protection system provides a lower impedance path to ground than the first cable, the second cable, and the third cable.

18. A wind turbine blade, comprising:
a discharge filter, located on a root of the wind turbine blade, including a first cable wound into a first inductor using the root as a mandrel;
a powered system, located in a body of the wind turbine blade; and
an electrical panel, located between the discharge filter and the powered system in the body of the wind turbine blade, wherein the first cable is configured to provide power to the powered system through the electrical panel; wherein the first inductor is at least partially embedded in a material comprising the root; wherein the first cable is a bundled cable including a live line, a neutral line, and a protective earth line.

19. The wind turbine blade of claim 18, wherein the discharge filter further includes:
a second cable wound into a second inductor using the root as a mandrel; and
a third cable wound into a third inductor using the root as a mandrel.

20. The wind turbine blade of claim 19, wherein a pathway between the first cable and the powered system is linked via a surge protection device to a lightning protection system offering a lower impedance path to ground than the first cable.

\* \* \* \* \*